United States Patent
Ito

(10) Patent No.: US 11,683,580 B2
(45) Date of Patent: *Jun. 20, 2023

(54) INFORMATION PROCESSING APPARATUS, INFORMATION PROCESSING METHOD, AND INFORMATION PROCESSING SYSTEM

(71) Applicant: SONY GROUP CORPORATION, Tokyo (JP)

(72) Inventor: Atsutaka Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,480

(22) Filed: Feb. 21, 2022

(65) Prior Publication Data

US 2022/0247938 A1 Aug. 4, 2022

Related U.S. Application Data

(63) Continuation of application No. 15/781,947, filed as application No. PCT/JP2016/078217 on Sep. 26, 2016, now Pat. No. 11,277,568.

(30) Foreign Application Priority Data

Dec. 28, 2015 (JP) ................................. 2015-256141

(51) Int. Cl.
*H04N 23/63* (2023.01)
*H04N 23/66* (2023.01)
(Continued)

(52) U.S. Cl.
CPC ........... *H04N 23/633* (2023.01); *H04N 23/63* (2023.01); *H04N 23/632* (2023.01); *H04N 23/66* (2023.01);
(Continued)

(58) Field of Classification Search
CPC ......... H04N 5/232939; H04N 5/23203; H04N 5/232935; H04N 5/23293; H04N 5/23245; G06F 3/04817
(Continued)

(56) References Cited

U.S. PATENT DOCUMENTS 5,512,941 A * 4/1996 Takahashi .............. H04N 5/772
348/81
9,361,011 B1 * 6/2016 Burns ................. G06F 3/04845
(Continued)

FOREIGN PATENT DOCUMENTS

CN 1794796 A 6/2006
CN 102137232 A 7/2011
(Continued)

OTHER PUBLICATIONS

Office Action for CN Patent Application No. 201680075039.7, dated Mar. 23, 2020, 10 pages of Office Action and 17 pages of English Translation.
(Continued)

*Primary Examiner* — Lin Ye
*Assistant Examiner* — Chan T Nguyen
(74) *Attorney, Agent, or Firm* — Chip Law Group

(57) ABSTRACT

An information processing apparatus including a display control unit that causes an image captured by any of one or a plurality of imaging devices to be displayed in a captured image display region that is a part of a display unit, causes second information related to the one or plurality of imaging devices to be displayed in a captured image hiding region that is a part of the display unit and different from the captured image display region, and causes first information related to the one or plurality of corresponding imaging devices to be displayed in the captured image display region in accordance with the second information being displayed (Continued)

and the one or plurality of imaging devices being in a predetermined state.

15 Claims, 20 Drawing Sheets

(51) Int. Cl.
*H04N 23/667* (2023.01)
*G06F 3/04817* (2022.01)

(52) U.S. Cl.
CPC ....... *H04N 23/667* (2023.01); *G06F 3/04817* (2013.01)

(58) Field of Classification Search
USPC ....................................... 348/207.1
See application file for complete search history.

(56) References Cited

U.S. PATENT DOCUMENTS

| | | | |
|---|---|---|---|
| 2003/0028876 A1* | 2/2003 | Eguchi | G06F 13/385 725/38 |
| 2009/0115844 A1* | 5/2009 | Cheng | H04N 23/60 348/81 |
| 2014/0354837 A1 | 12/2014 | Okazaki et al. | |
| 2015/0189150 A1 | 7/2015 | Morisawa | |
| 2015/0205505 A1 | 7/2015 | Conn et al. | |
| 2016/0048312 A1 | 2/2016 | Holaso | |
| 2016/0165142 A1 | 6/2016 | Hada | |
| 2016/0248964 A1 | 8/2016 | Okamoto | |

FOREIGN PATENT DOCUMENTS

| | | |
|---|---|---|
| CN | 102348067 A | 2/2012 |
| JP | 2004-221785 A | 8/2004 |
| JP | 2011-155449 A | 8/2011 |
| JP | 2012-044566 A | 3/2012 |
| JP | 2015-073229 A | 4/2015 |

OTHER PUBLICATIONS

International Search Report and Written Opinion of PCT Application No. PCT/JP2016/078217, dated Dec. 20, 2016, 13 pages of English Translation and 12 pages of ISRWO.
International Preliminary Report on Patentability of PCT Application No. PCT/JP2016/078217, dated Jul. 12, 2018, 14 pages of English Translation and 09 pages of IPRP.
Advisory Action for U.S. Appl. No. 15/781,947, dated Sep. 17, 2021, 03 pages.
Notice of Allowance for U.S. Appl. No. 15/781,947, dated Nov. 8, 2021, 08 pages.
Final Office Action for U.S. Appl. No. 15/781,947, dated Jul. 8, 2021, 19 pages.
Non-Final Office Action for U.S. Appl. No. 15/781,947, dated Feb. 23, 2021, 17 pages.
Advisory Action for U.S. Appl. No. 15/781,947, dated Jan. 13, 2021, 03 pages.
Final Office Action for U.S. Appl. No. 15/781,947, dated Nov. 6, 2020, 17 pages.
Final Office Action for U.S. Appl. No. 15/781,947, dated Feb. 6, 2020, 15 pages.
Non-Final Office Action for U.S. Appl. No. 15/781,947, dated Jun. 10, 2020, 20 pages.
Non-Final Office Action for U.S. Appl. No. 15/781,947, dated Oct. 3, 2019, 15 pages.

* cited by examiner

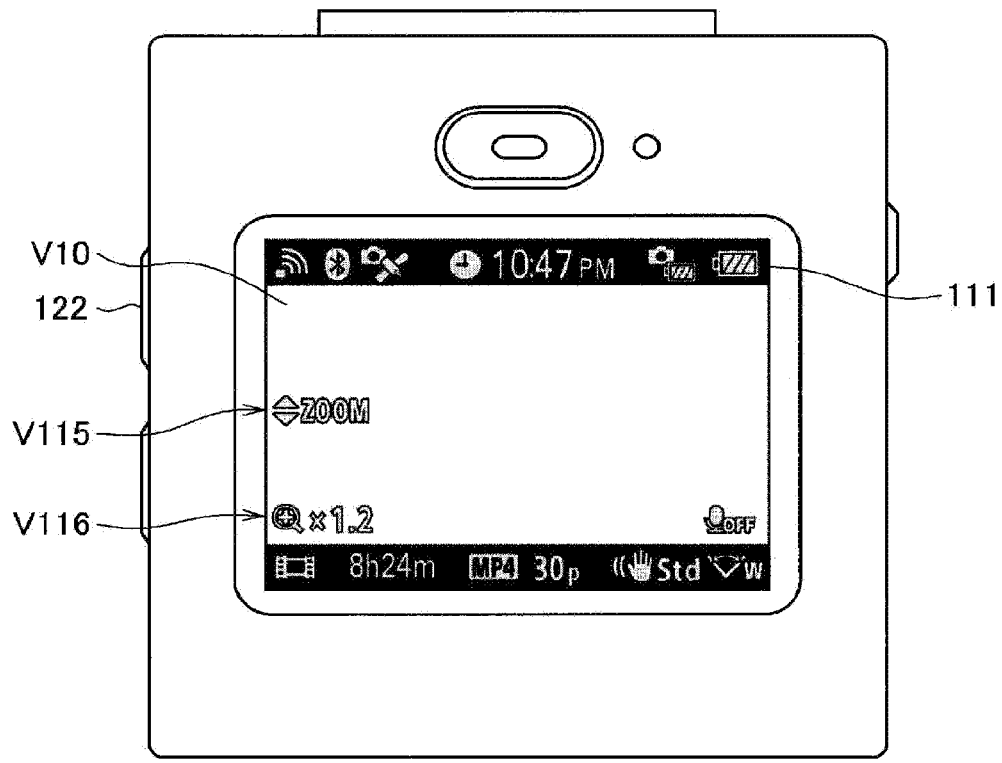

FIG. 20
| DISPLAY INFORMATION | STATE |
|---|---|
|    | VIEWING ANGLE SETTING (WIDE, MEDIUM, NARROW) |
|   | IMAGE STABILIZATION MODE (ACTIVE, STANDARD) |
|   | IMAGE STABILIZATION (ON, OFF) |
|    | VIDEO FORMAT (MP4, HD, 4K) |
| 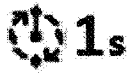 ~ 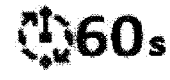 | INTERVAL TIMER |
|  | STATE OF MEDIUM (UNINSERTED) |

FIG. 21

| DISPLAY INFORMATION | STATE |
|---|---|
| | Wi-Fi SINGLE MODE |
| | Wi-Fi MULTI MODE |
| | Bluetooth ON (DEVICE BEING CONNECTED) |
| | Bluetooth ON (DEVICE UNCONNECTED) |
| | GPS (SEARCHING) |
| | GPS (MEASURING) |
| | AIRPLANE MODE |
| | REMAINING BATTERY LEVEL |
| | REMAINING BATTERY LEVEL ON IMAGING DEVICE SIDE |

FIG. 22

| DISPLAY INFORMATION | STATE |
|---|---|
| | WARNING OF TEMPERATURE ANOMALY |
| | WARNING OF TEMPERATURE ANOMALY ON IMAGING DEVICE SIDE |
| | PROCESSING BEING EXECUTED |
| | RECORDING FUNCTION OFF |
| | DURING HOLD |

| DISPLAY INFORMATION | STATE |
|---|---|
| ZOOM ⇕ | ASSIGN ZOOM CONTROL TO UP-DOWN KEY |
| MODE ⇕ | ASSIGN MODE CONTROL TO UP-DOWN KEY |
| — ⇕ | RESTRICT MANIPULATION WITH UP-DOWN KEY |
| 📷 ⇕ | ASSIGN SWITCHING OF IMAGING DEVICES TO UP-DOWN KEY |

INFORMATION PROCESSING APPARATUS, INFORMATION PROCESSING METHOD, AND INFORMATION PROCESSING SYSTEM

CROSS REFERENCE TO RELATED APPLICATIONS

The present application is a continuation application of U.S. patent application Ser. No. 15/781,947, filed on Jun. 6, 2018, which is a U.S. National Phase of International Patent Application No. PCT/JP2016/078217 filed on Sep. 26, 2016, which claims priority benefit of Japanese Patent Application No. JP 2015-256141 filed in the Japan Patent Office on Dec. 28, 2015. Each of the above-referenced applications is hereby incorporated herein by reference in its entirety.

TECHNICAL FIELD

The present disclosure relates to an information processing apparatus, an information processing method, a program, and an information processing system.

BACKGROUND ART

Imaging devices such as digital still cameras and digital video cameras (hereinafter collectively referred to as a "digital camera" in some cases) have been widely spread, and their types have been diversified. For example, Patent Literature 1 discloses an example of an imaging device configured as a digital camera.

In addition, in recent years, an imaging device has been proposed that can be manipulated from an external device such as a smartphone or a remote controller by utilizing a wireless network based on a standard such as Wi-Fi (Wireless Fidelity) (registered trademark) or Bluetooth (registered trademark).

CITATION LIST

Patent Literature

Patent Literature 1: JP 2012-44566A

DISCLOSURE OF INVENTION

Technical Problem

In addition, in recent years, the usage form and usage scenario of an imaging device have been diversified further along with achievement of size reduction of an image sensor and an optical system. In particular, in the case of capturing an image using an imaging device such as a digital camera, a usage form in which a user captures an image while checking information or the like that indicates various states such as a zoom magnification and a remaining battery level, in addition to a so-called preview image, may be expected. Expecting such circumstances, provision of an easier-to-use user interface (UI) that can present various types of information utilizing a restricted display region more effectively is demanded.

Therefore, the present disclosure proposes an information processing apparatus, an information processing method, a program, and an information processing system that can present various types of information related to image capturing in a more suitable manner.

Solution to Problem

According to the present disclosure, there is provided an information processing apparatus including: a display control unit configured to cause an image captured by any of one or a plurality of imaging devices to be displayed in a captured image display region that is a part of a display unit, cause second information related to the one or plurality of imaging devices to be displayed in a captured image hiding region that is a part of the display unit and different from the captured image display region, and cause first information related to the one or plurality of corresponding imaging devices to be displayed in the captured image display region in accordance with the second information being displayed and the one or plurality of imaging devices being in a predetermined state.

In addition, according to the present disclosure, there is provided an information processing method including, by a processor: causing an image captured by any of one or a plurality of imaging devices to be displayed in a captured image display region that is a part of a display unit; causing second information related to the one or plurality of imaging devices to be displayed in a captured image hiding region that is a part of the display unit and different from the captured image display region; and causing first information related to the one or plurality of corresponding imaging devices to be displayed in the captured image display region in accordance with the second information being displayed and the one or plurality of imaging devices being in a predetermined state.

In addition, according to the present disclosure, there is provided a program causing a computer to execute: causing an image captured by any of one or a plurality of imaging devices to be displayed in a captured image display region that is a part of a display unit; causing second information related to the one or plurality of imaging devices to be displayed in a captured image hiding region that is a part of the display unit and different from the captured image display region; and causing first information related to the one or plurality of corresponding imaging devices to be displayed in the captured image display region in accordance with the second information being displayed and the one or plurality of imaging devices being in a predetermined state.

In addition, according to the present disclosure, there is provided an information processing system including: one or a plurality of imaging devices configured to capture an image; and a display control device including a communication unit configured to communicate with the one or plurality of imaging devices and a display control unit configured to cause the image captured by any of the one or plurality of imaging devices to be displayed in a captured image display region that is a part of a display unit. The display control unit causes second information related to the one or plurality of imaging devices to be displayed in a captured image hiding region that is a part of the display unit and different from the captured image display region, and causes first information related to the one or plurality of corresponding imaging devices to be displayed in the captured image display region in accordance with the second information being displayed and the one or plurality of imaging devices being in a predetermined state.

Advantageous Effects of Invention

According to the present disclosure as described above, an information processing apparatus, an information processing method, a program, and an information processing system that can present various types of information related to image capturing in a more suitable manner are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 18 is an explanatory diagram for describing an example of a UI of the control device according to the embodiment.

FIG. 19 is an explanatory diagram for describing an example of display information to be displayed on the UI according to the embodiment.

FIG. 20 is an explanatory diagram for describing an example of display information to be displayed on the UI according to the embodiment.

FIG. 21 is an explanatory diagram for describing an example of display information to be displayed on the UI according to the embodiment.

FIG. 22 is an explanatory diagram for describing an example of display information to be displayed on the UI according to the embodiment.

MODE(S) FOR CARRYING OUT THE INVENTION

Figure 1:
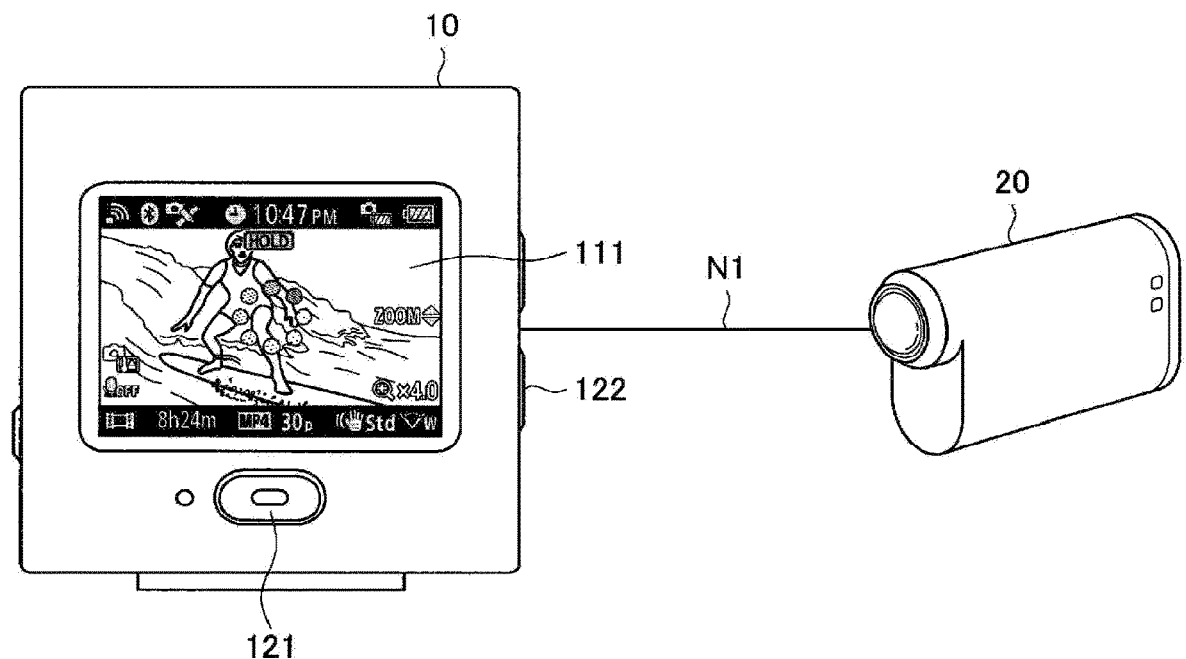
FIG. 1 is an explanatory diagram for describing an example of a schematic system configuration of an information processing system according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. First embodiment
1.1. System configuration
1.2. Appearance example of apparatus
1.2.1. Configuration of control device
1.2.2. Configuration of imaging device
1.3. Functional configuration
1.4. Technical characteristics
1.4.1. Comparative example
1.4.2. UI of control device
1.4.3. Specific example of display information
1.4.4. UI of imaging device
1.4.5. Configuration of manipulation menu
1.5. Evaluation
2. Second embodiment
2.1. System configuration
2.2. Technical characteristics
2.3. Evaluation
3. Hardware configuration
4. Conclusion 1. First Embodiment 1.1. System Configuration First, an example of a system configuration of an information processing system according to a first embodiment of the present disclosure will be described with reference to FIG. 1. FIG. 1 is an explanatory diagram for describing an example of a schematic system configuration of the information processing system according to the present embodiment.

As shown in FIG. 1, an information processing system 1 according to the present embodiment includes a control device 10 and an imaging device 20. The imaging device 20 is equivalent to a device for capturing an image such as a still image or a moving image, such as a so-called digital camera.

In addition, the control device 10 is equivalent to a device for controlling the operation of the imaging device 20 from the outside, such as a so-called remote controller or the like. Note that the control device 10 may be a user terminal such as a so-called smartphone or the like.

The control device 10 and the imaging device 20 are connected to be capable of communicating with each other via a wireless network N1. A specific example of the network N1 includes a network based on the Wi-Fi (registered trademark) standard. In the case of applying the network N1 based on the Wi-Fi standard, for example, it is possible to achieve a communication form as shown in FIG. 1 by causing the control device 10 to operate as an access point and connecting the imaging device 20 as a station to the control device 10.

In addition, the control device 10 according to the present embodiment is configured to be capable of controlling the operation (for example, the operation related to image capturing) of the imaging device 20 connected via the network N1. That is, the imaging device 20 is capable of capturing an image such as a moving image or a still image on the basis of an instruction transmitted from the control device 10 via the network N1.

More specifically, the control device 10 includes a display unit 111 and an input unit such as a recording button 121 and an up-down button 122 which will be described later or the like. The display unit 111 includes a liquid crystal display or the like, and presents various types of information as display information. In addition, the input unit such as the recording button 121 and the up-down button 122 or the like is configured as a manipulation device such as a so-called button, switch, or the like, and accepts an input from a user.

On the basis of such a configuration, the control device 10 presents an image (for example, a preview image) captured by the imaging device 20 and transmitted from the imaging device 20 via the network N1, for example, to the user via the display unit 111. In addition, the control device 10 may acquire information indicating the setting and state of the imaging device 20 from the imaging device 20 via the network N1, and may present the acquired information to the user via the display unit 111.

In addition, the control device 10 is also capable of instructing the imaging device 20 to perform the operation related to image capturing via the network N1 on the basis of an input from the user via the input unit such as the recording button 121 and the up-down button 122 or the like. Accordingly, it is also possible for the user to instruct the imaging device 20 to perform the operation related to image capturing via the control device 10 while checking a preview image displayed on the display unit 111 of the control device 10, for example.

Note that the operation of the imaging device 20 that can be controlled by the control device 10 via the network N1 is not limited only to the operation of capturing an image such as a moving image or a still image. For example, the control device 10 is also capable of controlling an operation related to the setting for capturing an image, such as an adjustment of zoom or shutter speed or the like, via the network N1. Note that, in the case of describing "the operation related to image capturing" in the following description, it is assumed that an operation related to the setting for capturing an image may also be included in addition to the operation of capturing an image. In addition, the above-described function may be achieved by, for example, installing an application created utilizing an application programming interface (API) for controlling the operation of the imaging device 20 via a network in the control device 10. As a matter of course, an application for achieving the above-described function may be incorporated in the control device 10 in advance.

Note that the control device 10 and the imaging device 20 may be connected to be capable of communicating with each other via another network different from the network N1, in addition to the network N1. As a specific example, the control device 10 and the imaging device 20 may be connected via a network based on the Bluetooth (registered trademark) standard. In this case, for example, the control device 10 and the imaging device 20 may selectively switch between the above-described network based on the Wi-Fi standard and a network based on the Bluetooth standard.

More specifically, communication based on the Bluetooth standard is restricted in communication band as compared with communication based on the Wi-Fi standard, but is advantageous in that the operation can be performed with less consumption power. Thus, in a situation where an image is not transmitted/received between the control device 10 and the imaging device 20, for example, communication based on the Wi-Fi standard may be stopped temporarily, and only control information may be transmitted/received through communication based on the Bluetooth standard. Examples of the situation where an image is not transmitted/received between the control device 10 and the imaging device 20 include a situation where the control device 10 is brought into the so-called sleep state, and the like.

Note that the imaging device 20 may be configured such that, in the case where the imaging device 20 is not connected to the control device 10 via the network N1, the imaging device 20 itself can operate independently. Thus, the imaging device 20 may be provided with a manipulation interface (for example, an input interface such as a button, an output interface such as a display, and the like) for manipulating the imaging device 20.

An example of a schematic system configuration of the information processing system according to the first embodiment of the present disclosure has been described above with reference to FIG. 1.

1.2. Appearance Example of Apparatus

Next, an example of schematic configurations of the control device 10 and the imaging device 20 according to the first embodiment of the present disclosure will be described.

1.2.1. Configuration of Control Device

First, an example of a schematic configuration of the control device 10 according to the present embodiment will be described with reference to FIG. 2 to FIG. 6. FIG. 2 to FIG. 6 are five side views showing an example of a schematic configuration of the control device 10 according to the present embodiment, and respectively show the front view, the rear view, the right side view, the left side view, and the bottom view of the control device 10. Note that the present description will be made assuming the direction corresponding to the top to the bottom of the front view shown in FIG. 2 as the vertical direction of the control device 10, and assuming the direction corresponding to the left to the right as the lateral direction of the control device 10.

Figure 2:
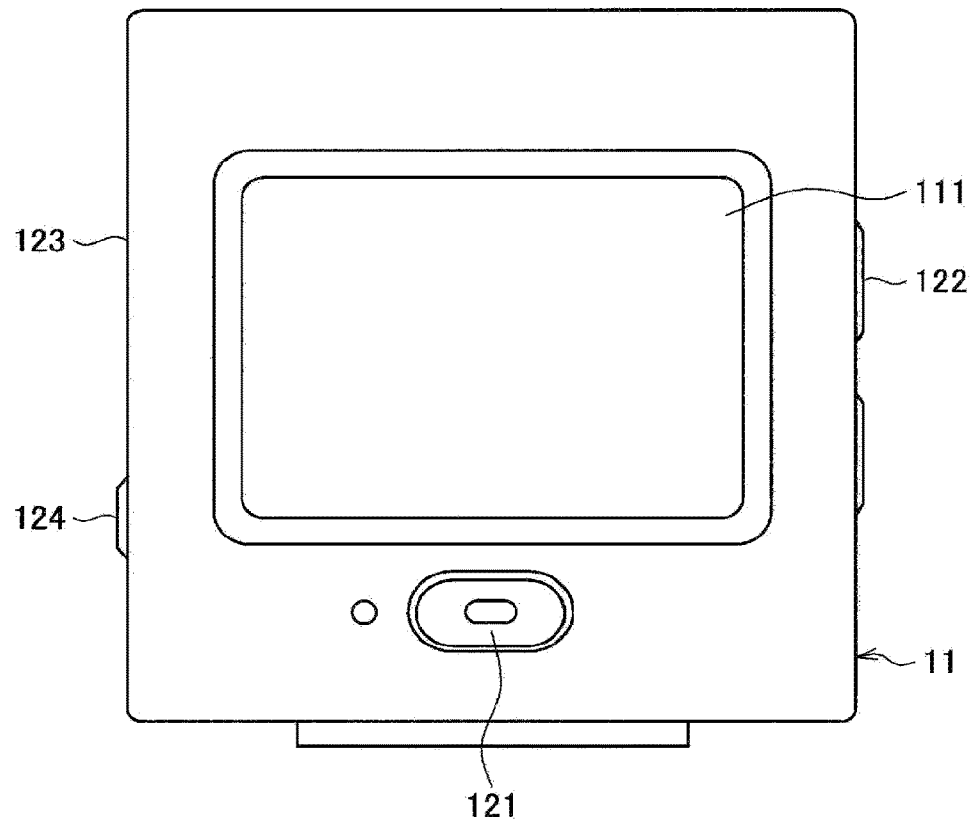
FIG. 2 is a front view of a control device according to the embodiment.
Figure 3:
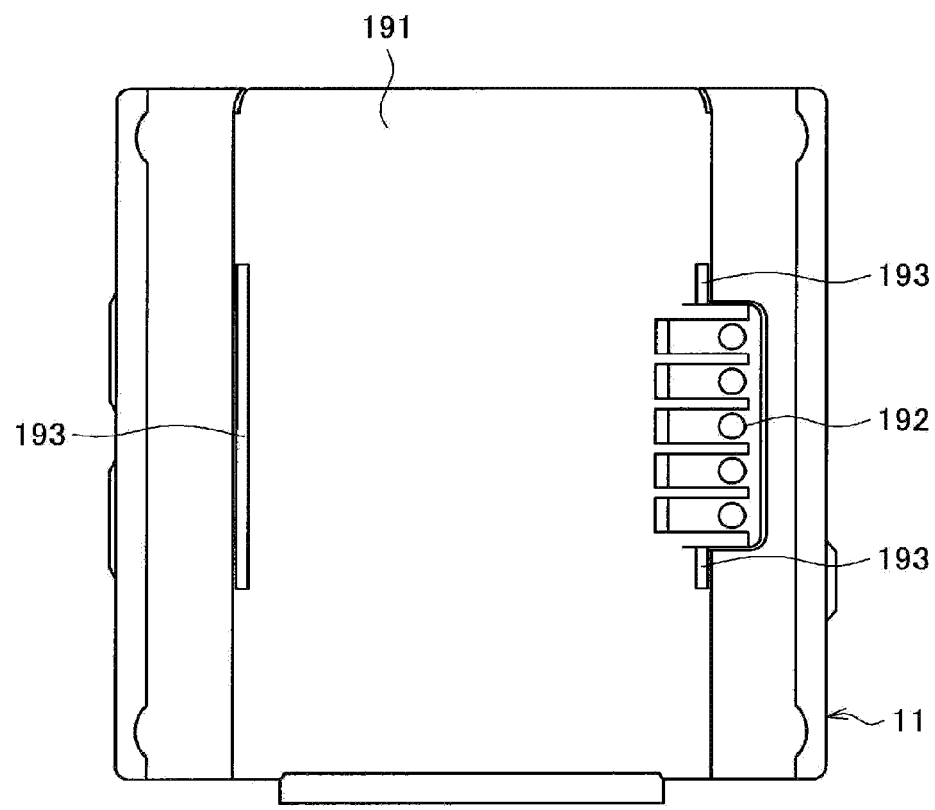
FIG. 3 is a rear view of the control device according to the embodiment.

The control device 10 has a plate-like housing 11 whose front surface and rear surface have been formed in a substantially rectangular shape as shown in FIG. 2 and FIG. 3. In addition, the top surface and the bottom surface of the housing 11 have such a curved shape that arcs are formed from the front surface side to the rear surface side as shown in FIG. 4 and FIG. 5.

The display unit 111 which is substantially rectangular is provided on the front surface of the housing 11 as shown in FIG. 2, and the recording button 121 is provided under the display unit 111. The display unit 111 is equivalent to the display unit 111 described with reference to FIG. 1. In addition, the recording button 121 is an input interface for instructing the imaging device 20 connected to the control device 10 via a network to start and stop recording of a moving image or to capture a still image. Note that another function may be assigned to the recording button 121. In addition, it may be configured such that functions assigned to the recording button 121 can be switched selectively.

Figure 4:
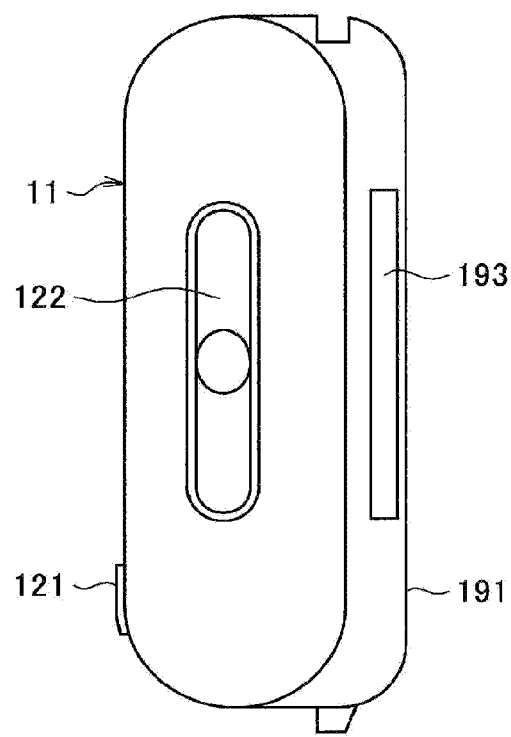
FIG. 4 is a right side view of the control device according to the embodiment.

On the right side surface of the housing 11, the up-down button 122 formed in a long shape along the vertical direction of the housing 11 is provided as shown in FIG. 4. The up-down button 122 is an input interface for performing a manipulation such as selection from a menu for manipulating the control device 10 or switching between modes or functions. The up-down button 122 is configured such that the upper end side and the lower end side can each be pressed down with the center in the vertical direction serving as the base point. As a specific example, the up-down button 122 may include a so-called seesaw switch, and may be configured such that the upper end side and the lower end side can be pressed down exclusively.

Figure 5:
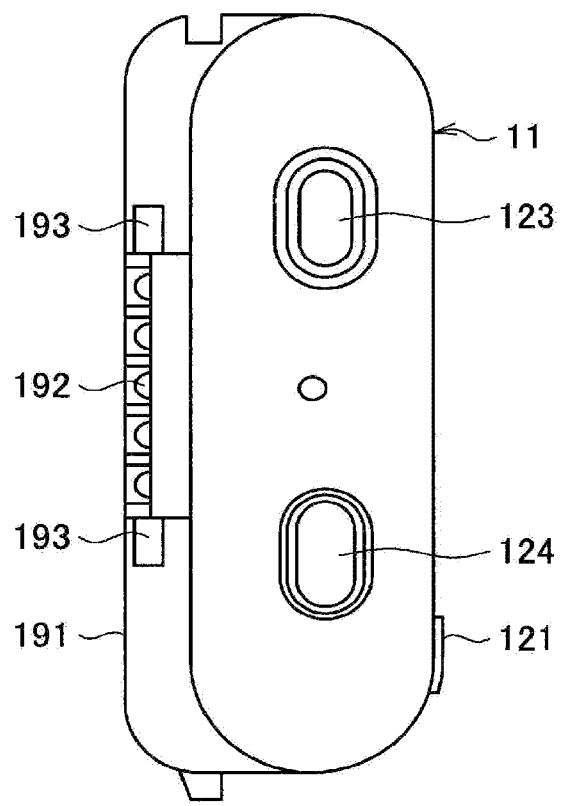
FIG. 5 is a left side view of the control device according to the embodiment.

On the left side surface of the housing 11, a power button 123 and a menu button 124 are provided as shown in FIG. 5. For example, in the example shown in FIG. 5, the power button 123 and the menu button 124 are provided on the left side surface of the housing 11 so as to align in the vertical direction of the housing 11. The power button 123 is an input interface for turning on and off the power of the control device 10. In addition, the menu button 124 is an input interface for causing the manipulation menu of the control device 10 to be displayed on the display unit 111. Note that another function may be assigned to the menu button 124. In addition, it may be configured such that functions assigned to the menu button 124 can be switched selectively.

Figure 6:
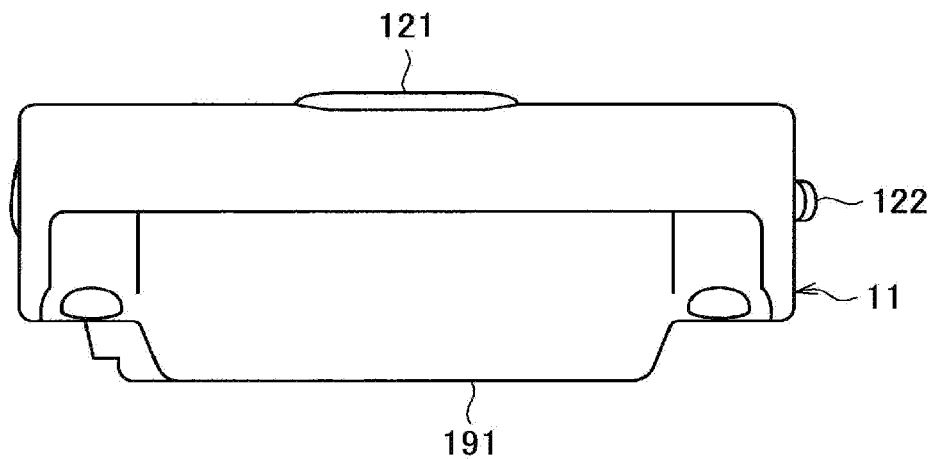
FIG. 6 is a bottom view of the control device according to the embodiment.
Figure 7:
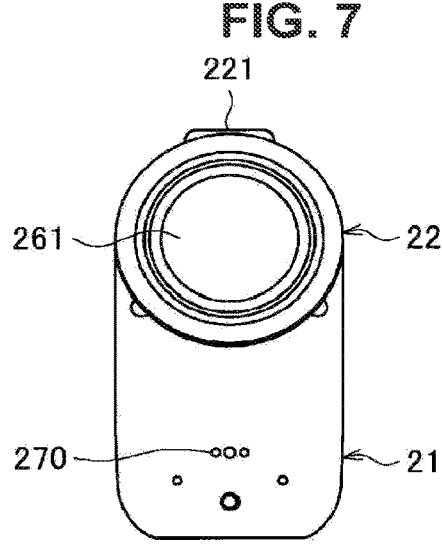
FIG. 7 is a front view of an imaging device according to the embodiment.

In addition, as shown in FIG. 2 and FIG. 6, on the rear surface of the housing 11, a projecting portion 191 extending toward the vertical direction of the housing 11 such that side surfaces are formed in the lateral direction is provided. In addition, a connector 192 is provided on one of the lateral ends of the projecting portion 191, as shown in FIG. 3. The connector 192 is a component for electrically connecting a battery charger or another external unit to the control device 10. In the example shown in FIG. 3, for example, the connector 192 is provided on an end of the projecting portion 191 that is equivalent to the left side surface side of the housing 11.

In addition, a fitting portion 193 is provided on each of the left and right side surfaces of the projecting portion 191 as shown in FIG. 3 to FIG. 5. For example, the fitting portion 193 is formed as a long shaped recess along the direction in which the projecting portion 191 extends (that is, the vertical direction of the housing 11), as shown in FIG. 4 and FIG. 5. In this manner, by providing the projecting portion 191 on the rear surface of the housing 11 and forming the fitting portions 193 in the side surfaces of the projecting portion 191, it is possible to attach a supporting member, such as a harness or a strap for mounting the control device 10 on an area (for example, an arm or the like) of the user, to the rear surface of the housing 11. As a more specific example, the supporting member may be provided with fitting portions (for example, projecting portions) formed to be fittable into the left and right fitting portions 193, respectively. With such a configuration, by fitting the fitting portions provided on the supporting member side into the fitting portions 193 on the control device 10 side and sandwiching the projecting portion 191 on the control device 10 side by the fitting portions on the supporting member side from the lateral direction, it is possible to mount the supporting member on the rear surface of the control device 10.

Note that the configuration of the projecting portion 191 and the fitting portions 193 is a mere example, and the configuration of portions equivalent to the projecting portion 191 and the fitting portions 193 is not particularly limited as long as it is possible to mount a supporting member such as a harness or a strap on the rear surface of the housing 11 of the control device 10.

An example of a schematic configuration of the control device 10 according to the present embodiment has been described above with reference to FIG. 2 to FIG. 6.

1.2.2. Configuration of Imaging Device

Next, an example of a schematic configuration of the imaging device 20 according to the present embodiment will be described with reference to FIG. 7 to FIG. 12. FIG. 7 to FIG. 12 are six side views showing an example of a schematic configuration of the imaging device 20 according to the present embodiment, and respectively show the front view, the rear view, the right side view, the left side view, the top view, and the bottom view of the imaging device 20. Note that the present description will be made assuming the direction corresponding to the top to the bottom of the front view shown in FIG. 7 as the vertical direction of the imaging device 20, and assuming the direction corresponding to the left to the right as the lateral direction of the imaging device 20. In addition, in the lateral direction of the right side view shown in FIG. 9, the left direction (that is, the front view side) is assumed as the front of the imaging device 20, and the right direction (that is, the rear surface side) is assumed as the back of the imaging device 20.

As shown in FIG. 7 to FIG. 12, the imaging device 20 includes a substantially cuboid housing 21 whose right side surface and left side surface have been formed in a substantially rectangular shape, and a substantially cylindrical lens unit 22 provided on the upper side of the front surface of the housing 21 so as to protrude forward. The top surface of the housing 21 is formed as such a curved shape that an arc is formed from the right side surface to the left side surface. In addition, an axis L of the substantially cylindrical lens unit 22 substantially matches the direction from the back to the front of the imaging device 20. In addition, the lens unit 22 is formed such that a part of a surface positioned on the upper side of the peripheral surface of the cylinder continues to the curved top surface of the housing 21. In addition, the horizontal width (that is, the width between the right side surface and the left side surface) of the housing 21 and the diameter of the lens unit 22 substantially match. Note that the lens unit 22 may be formed integrally with the housing 21.

In addition, a lens optical system 261 is provided on the front side of the lens unit 22. At this time, the optical axis direction of the lens optical system 261 substantially matches the axis L of the substantially cylindrical lens unit 22.

In addition, on the front surface of the housing 21, a sound collection unit 270 is provided under the lens unit 22.

Figure 9:
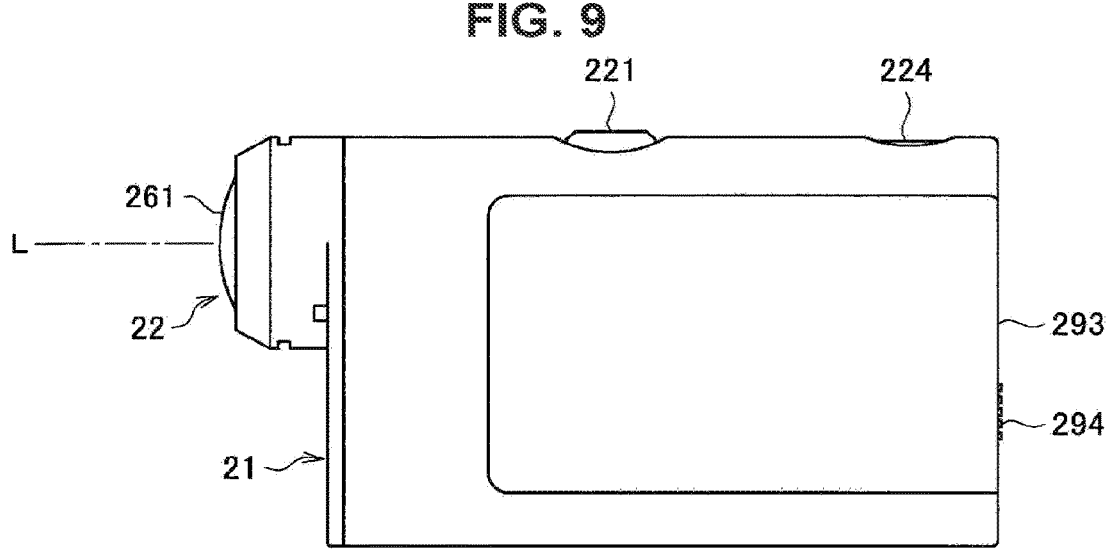
FIG. 9 is a right side view of the imaging device according to the embodiment.
Figure 10:
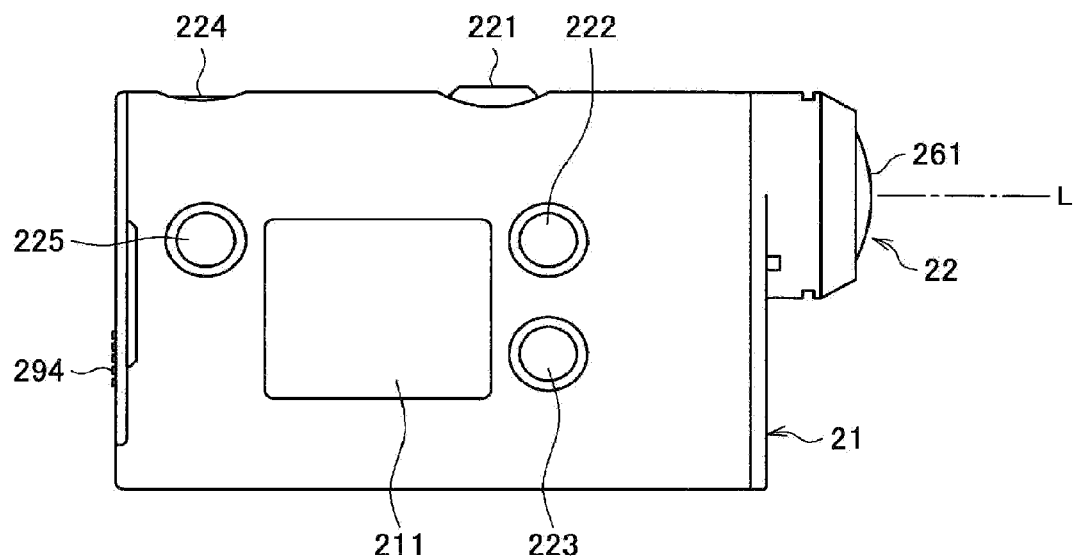
FIG. 10 is a left side view of the imaging device according to the embodiment.
Figure 11:
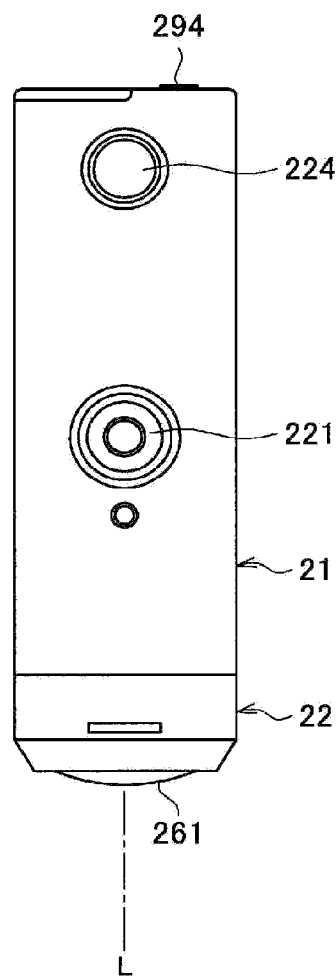
FIG. 11 is a top view of the imaging device according to the embodiment.

On the top surface of the housing 21, a recording button 221 and a power button 224 are provided as shown in FIG. 11. The recording button 221 is an input interface for instructing the imaging device 20 to start and stop recording of a moving image or to capture a still image. Note that another function may be assigned to the recording button 221. The recording button 221 is provided such that the top surface of the button protrudes from the top surface of the housing 21 as shown in FIG. 9 and FIG. 10. In addition, the power button 224 is provided such that the top surface of the button is buried in the top surface of the housing 21.

On the left side surface of the housing 21, a display unit 211, an upper button 222, a lower button 223, and a menu button 225 are provided as shown in FIG. 10. The display unit 211 includes a liquid crystal display or the like, and presents various types of information as display information. The upper button 222 and the lower button 223 are input interfaces for performing a manipulation such as selection from a menu for manipulating the imaging device 20 or switching between modes or functions. In addition, the menu button 225 is an input interface for causing the manipulation menu of the imaging device 20 to be displayed on the display unit 211. Note that another function may be assigned to the menu button 225.

The upper button 222 and the lower button 223 are provided to align in the vertical direction close to the display unit 211 so as to be positioned on the right side with respect to the display unit 211 (that is, the front side of the imaging device 20). Note that the upper button 222 and the lower button 223 are provided such that the upper button 222 is positioned on the upper side, and the lower button 223 is positioned on the lower side. That is, the positional relationship of the display unit 211 with the upper button 222 and the lower button 223 is similar to the positional relationship between the display unit 111 and the up-down button 122 in the control device 10 described with reference to FIG. 2 and FIG. 4. Thus, it is possible for the user to intuitively manipulate the upper button 222 and the lower button 223 with a similar sense to the case of manipulating the up-down button 122 in the control device 10.

In addition, the menu button 225 is provided close to the display unit 211 so as to be positioned on the left side with respect to the display unit 211 (that is, the back side of the imaging device 20).

On the right side surface the housing 21, a battery compartment is provided as shown in FIG. 9, and a part of the right side surface of the housing 21 is configured as a battery cover 293 that covers the battery compartment. The battery cover 293 is configured to be attachable/detachable to/from the housing 21 by being slid backward. That is, by removing the battery cover 293, a battery holder is exposed, and it is possible to insert/remove the battery into/from the battery holder. Note that an end of the battery cover 293 on the front side may be supported pivotably on the housing 21. On the basis of such a configuration, the battery cover 293 may be configured to be openable/closable by pivoting the end on the back side with the end on the front side supported by the housing 21 serving as the base point.

Figure 8:
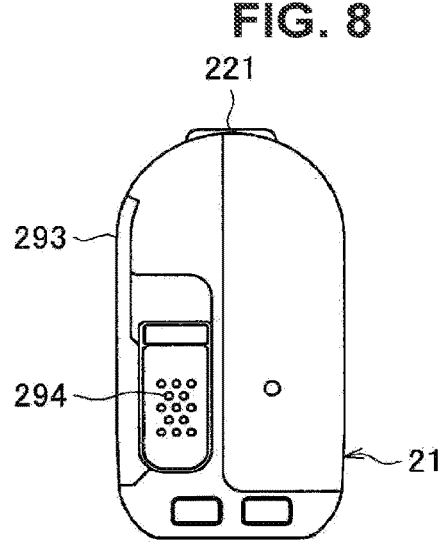
FIG. 8 is a rear view of the imaging device according to the embodiment.

In addition, at least a part of the end of the battery cover 293 on the back side is extended to the rear surface side of the housing 21, and a lock switch 294 is provided on the portion extended to the rear surface side as shown in FIG. 8. The lock switch 294 is configured as a so-called slide switch. By being slid upward in a state where the battery cover 293 is mounted on the housing 21, the lock switch 294 restricts backward sliding of the battery cover 293 (that is, an action for removing the battery cover 293).

Figure 12:
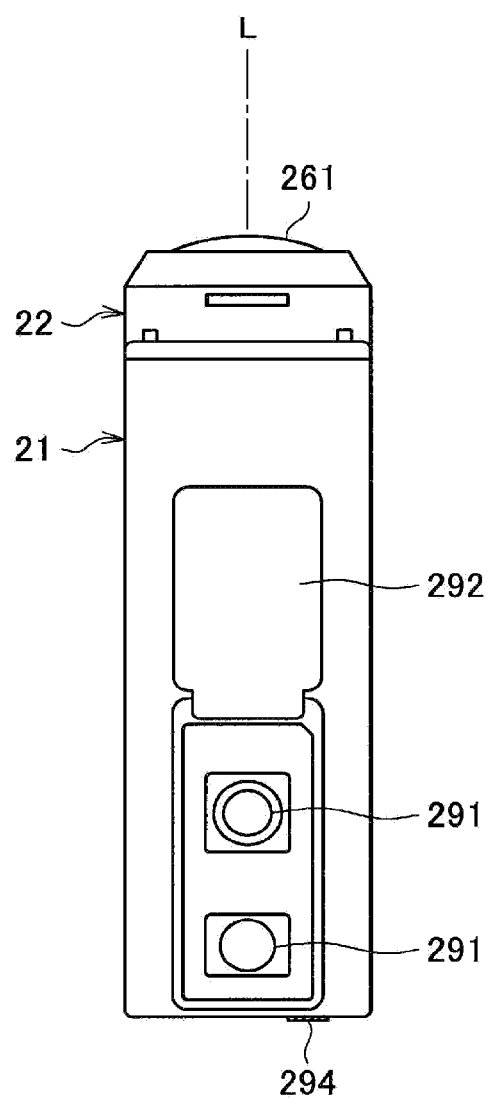
FIG. 12 is a bottom view of the imaging device according to the embodiment.

On the bottom surface of the housing 21, a fitting portion 291 and a memory card slot 292 are provided as shown in FIG. 12. The memory card slot 292 is configured such that a memory card which is a semiconductor recording medium can be attached/detached. With a memory card inserted into the memory card slot 292, it is possible for the imaging device 20 to record or read out image data such as a moving image or a still image.

The fitting portion 291 is a component for mounting a supporting member for supporting the imaging device 20, such as a tripod, a harness, a strap, or the like, on the bottom surface of the imaging device 20. For example, the fitting portion 291 may be formed as a so-called screw hole (female screw) obtained by forming a thread on the inner surface of a recess. In this case, by screwing a screw provided on the supporting member side into the fitting portion 291, it is possible to mount the supporting member on the bottom surface of the imaging device 20.

Note that the above-described configuration of the fitting portion 291 is a mere example, and the configuration of the fitting portion 291 is not particularly limited as long as a supporting member such as a tripod, a harness, a strap, or the like can be mounted on the bottom surface of the imaging device 20.

An example of a schematic configuration of the imaging device 20 according to the present embodiment has been described above with reference to FIG. 7 to FIG. 12.

1.3. Functional Configuration

Figure 13:
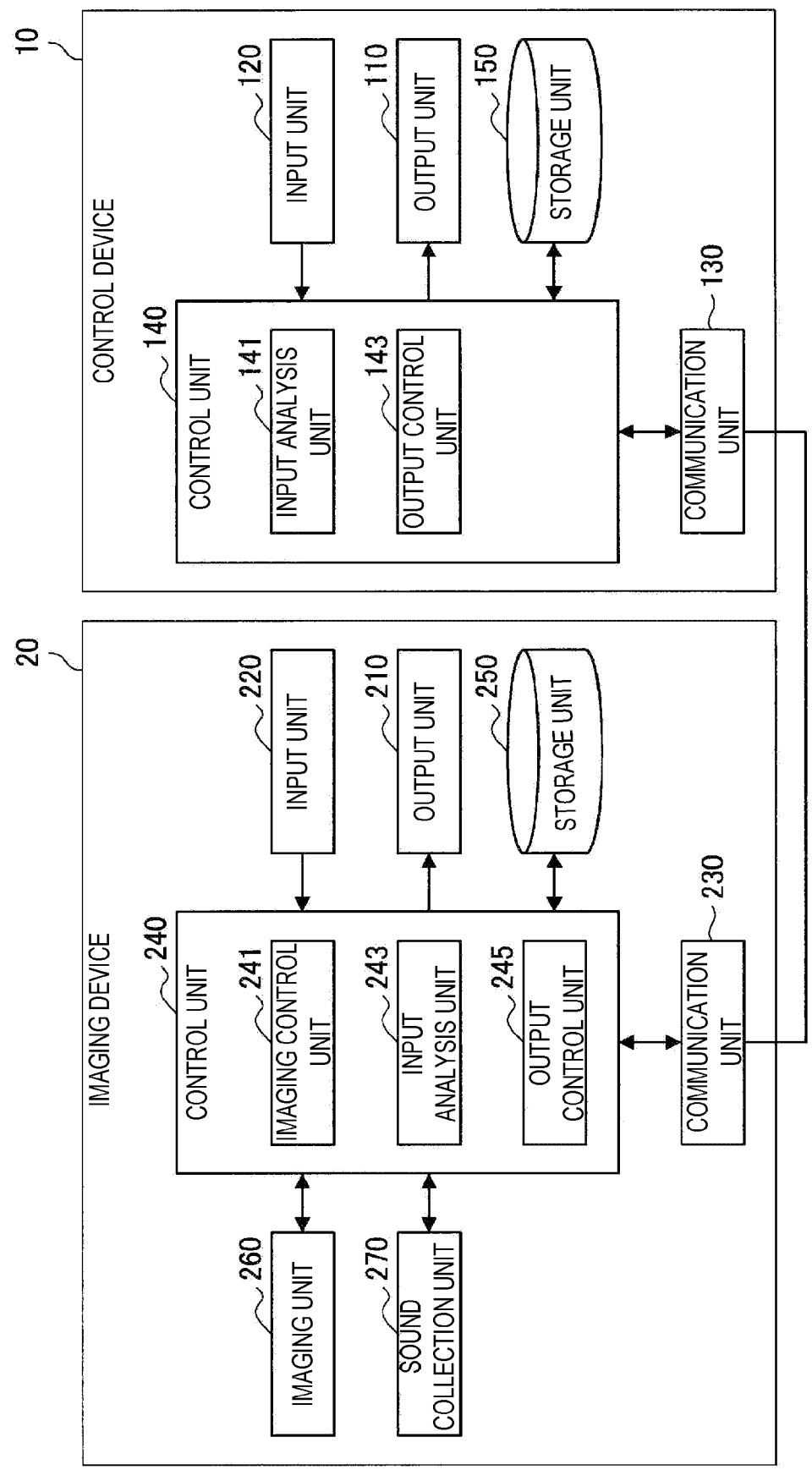
FIG. 13 is a block diagram showing an example of a functional configuration of the information processing system according to the embodiment.

Subsequently, an example of a functional configuration of the information processing system 1 according to the present embodiment will be described with reference to FIG. 13, particularly paying attention to a functional configuration of each of the control device 10 and the imaging device 20. FIG. 4 is a block diagram showing an example of the functional configuration of the information processing system 1 according to the present embodiment.

(Imaging Device 20)

First, description will be made paying attention to the functional configuration of the imaging device 20 according to the present embodiment. As shown in FIG. 13, the imaging device 20 includes an imaging unit 260, an output unit 210, an input unit 220, a communication unit 230, a control unit 240, and a storage unit 250. Note that the imaging device 20 may include the sound collection unit 270. In addition, the control unit 240 includes an imaging control unit 241, an input analysis unit 243, and an output control unit 245.

The communication unit 230 is a communication interface for each component in the imaging device 20 to communicate with an external device (for example, the control device 10) via a network. Examples of the network include the wireless network N1 described with reference to FIG. 1. As a matter of course, as long as it is a network that can connect the imaging device 20 and an external device, its form is not particularly limited. Note that, in the following description, in the case where each component in the imaging device 20 transmits/receives information to/from an external device via a network, it is assumed that the information is transmitted/received via the communication unit 230 even in the case where there is no particular description.

The imaging unit 260 includes an image sensor such as a complementary metal-oxide semiconductor (CMOS) image sensor or a charge coupled device (CCD) image sensor, and an optical system such as a lens, and is a component for capturing an image of a subject. For example, the imaging unit 260 may be configured such that a focal position and a so-called optical zoom magnification can be adjusted by shifting the optical system such as a lens along the optical axis direction. Note that the operation of the imaging unit 260 is controlled by the control unit 240. In addition, the imaging unit 260 outputs data (hereinafter referred to as "image data" as well) of a captured image to the control unit 240.

The sound collection unit 270 includes a sound collection device such as a so-called microphone or the like, and collects external sound (for example, ambient sound, voice, or the like). The operation of the sound collection unit 270 is controlled by the control unit 240. In addition, the sound collection unit 270 outputs data indicating the result of sound collection (hereinafter referred to as "acoustic data" as well) to the control unit 240.

The storage unit 250 is a storage area for storing various types of data temporarily or permanently. For example, image data based on the result of imaging of the imaging unit 260 and acoustic data based on the result of sound collection performed by the sound collection unit 270 are recorded in the storage unit 250. In addition, data for the imaging device 20 to execute various functions may be recorded in the storage unit 250. As a specific example, data (for example, a library) for executing various applications, management data for managing various settings and the like, and the like may be recorded in the storage unit 250.

The input unit 220 is an input interface for the user to input various types of information to the imaging device 20. The input unit 220 may include an input device for the user to input information, such as a button, a switch, a touch panel, or the like, for example. For example, each of the recording button 221, the power button 224, the upper button 222, the lower button 223, and the menu button 225 described with reference to FIG. 7 to FIG. 12 is equivalent to an example of the input unit 220. Then, the input unit 220 outputs control information indicating manipulation contents input by the user to the control unit 240.

The output unit 210 is an output interface for the imaging device 20 to present various types of information to the user. The output unit 210 may include a display device that outputs an image such as a still image or a moving image, such as a so-called display or the like, for example. For example, the display unit 211 described with reference to FIG. 7 to FIG. 12 is equivalent to an example of the output unit 210. In addition, the output unit 210 may include an acoustic device that outputs sound, such as a speaker or the like, for example. In addition, the output unit 210 may include a vibration device, such as a so-called vibrator or the like, that, by vibrating in a pattern corresponding to information to be a presentation target, presents the information to the user.

The input analysis unit 243 acquires control information indicating a user input from the input unit 220, and recognizes instruction contents from the user on the basis of the acquired control information. For example, on the basis of control information indicating manipulation contents via a button, the input analysis unit 243 may specify a function associated with the button (that is, a function instructed by the user to be executed). In addition, on the basis of control information indicating manipulation contents via a button, a touch panel, or the like, the input analysis unit 243 may specify information selected by the user as a manipulation target among various types of information presented via the output unit 210. In the foregoing manner, the input analysis unit 243 recognizes the instruction contents from the user on the basis of control information acquired from the input unit 220, and outputs information indicating the instruction contents to the imaging control unit 241 or the output control unit 245 in accordance with the instruction contents.

In addition, the input analysis unit 243 may acquire information indicating the instruction contents from the user input via the control device 10 from the control device 10 via the network. In this case, the input analysis unit 243 outputs the acquired information indicating the instruction contents to the imaging control unit 241 or the output control unit 245 in accordance with the instruction contents.

The imaging control unit 241 controls the operation related to image capturing. For example, the imaging control unit 241 acquires information indicating an instruction of the operation related to image capturing based on an input from the user from the input analysis unit 243, and controls the operation of the imaging unit 260 on the basis of the acquired information. In addition, the imaging control unit 241 acquires image data from the imaging unit 260 as the result of imaging, and outputs the acquired image data to the output control unit 245.

In addition, the imaging control unit 241 may control the operation of the sound collection unit 270. For example, the imaging control unit 241 acquires information indicating an instruction of the operation related to sound collection based on an input from the user from the input analysis unit 243, and controls the operation of the sound collection unit 270 on the basis of the acquired information. In addition, the imaging control unit 241 acquires acoustic data from the sound collection unit 270 as the result of sound collection, and outputs the acquired acoustic data to the output control unit 245.

In addition, the imaging control unit 241 may update various settings and operation modes of each of the imaging unit 260 and the sound collection unit 270 on the basis of an instruction from the user acquired via the input analysis unit 243.

In addition, the imaging control unit 241 may monitor the state of the imaging unit 260 or the sound collection unit 270, and may output information indicating the result of monitoring to the output control unit 245. As a specific example, the imaging control unit 241 may monitor the temperature of the imaging unit 260 on the basis of information indicating the result of sensing of the temperature of the imaging unit 260 output from a predetermined temperature sensor (illustration omitted), and may output information indicating the result of monitoring to the output control unit 245. In addition, in the case where various settings and operation modes of each of the imaging unit 260 and the sound collection unit 270 are updated, the imaging control unit 241 may output information indicating the result of update to the output control unit 245.

The output control unit 245 is a component for controlling output of various types of information. For example, the output control unit 245 may acquire image data based on the result of imaging performed by the imaging unit 260 from the imaging control unit 241, and may cause the acquired image data to be output to the output unit 210 (for example, a display or the like). In addition, the output control unit 245 may acquire acoustic data based on the result of sound collection performed by the sound collection unit 270 from the imaging control unit 241, and may cause the acquired acoustic data to be output to the output unit 210 (for example, a microphone or the like). In addition, the output control unit 245 may cause the image data or acoustic data acquired from the imaging control unit 241 to be recorded in the storage unit 250.

In addition, the output control unit 245 may acquire information indicating the result of update of various settings and operation modes of each of the imaging unit 260 and the sound collection unit 270 from the imaging control unit 241, and may update management data for managing the settings and operation modes on the basis of the acquired information. Note that the management data may be managed by being recorded in the storage unit 250, for example. In addition, the output control unit 245 may cause information indicating various settings and operation modes of each of the imaging unit 260 and the sound collection unit 270 to be output to the output unit 210 (for example, a display or the like) on the basis of the management data.

In addition, the output control unit 245 may acquire information indicating the result of monitoring the state of the imaging unit 260 or the sound collection unit 270 from the imaging control unit 241. As a specific example, the output control unit 245 may acquire information indicating the result of monitoring the temperature of the imaging unit 260 from the imaging control unit 241. Accordingly, in the case where the temperature of the imaging unit 260 indicates a value outside a predetermined range, for example, it is also possible for the output control unit 245 to sense this state as a temperature anomaly and to cause information indicating a warning of the temperature anomaly to be output to the output unit 210.

In addition, the output control unit 245 may acquire information indicating an instruction of an operation related to output of various types of information based on an input from the user from the input analysis unit 243, and may cause the output unit 210 to output information instructed to be output on the basis of the acquired information. As a specific example, the output control unit 245 may cause a manipulation menu for the user to instruct the imaging device 20 to execute various functions to be output to the output unit 210 (for example, a display or the like).

Note that an example of a UI (for example, a manipulation screen) for the output control unit 245 to cause the above-described various types of data and information to be output to the output unit 210 will be described later in detail separately.

In addition, the output control unit 245 may transmit acquired various types of information to the control device 10 via the network. As a specific example, the output control unit 245 may transmit image data (for example, a preview image or the like) based on the result of imaging performed by the imaging unit 260 to the control device 10. Accordingly, it is possible for the control device 10 to present the image data to the user. The same also applies to acoustic data based on the result of sound collection performed by the sound collection unit 270. In addition, the output control unit 245 may transmit image data or acoustic data recorded in the storage unit 250 to the control device 10. In addition, the output control unit 245 may transmit information indicating various settings and operation modes of each of the imaging unit 260 and the sound collection unit 270 to the control device 10. Accordingly, it is possible for the control device 10 to notify the user of the settings and operation modes. Similarly, the output control unit 245 may transmit information based on the result of monitoring the state of the imaging unit 260 or the sound collection unit 270 to the control device 10. Accordingly, it is possible for the control device 10 to notify the user of the state of the imaging unit 260 or the sound collection unit 270.

(Control Device 10)

Next, description will be made paying attention to the functional configuration of the control device 10 according to the present embodiment. As shown in FIG. 13, the control device 10 according to the present embodiment includes the display unit 111, an input unit 120, a communication unit 130, a control unit 140, and a storage unit 150. In addition, the control unit 140 includes an input analysis unit 141 and an output control unit 143. Note that the control unit 140 is equivalent to an example of the "imaging control unit" in the control device 10.

The communication unit 130 is a communication interface for each component in the control device 10 to communicate with an external device (for example, the imaging device 20) via a network. Note that, as the communication unit 130, a component similar to the aforementioned communication unit 230 may be applied. Note that, in the following description, in the case where each component in the control device 10 transmits/receives information to/from an external device via a network, it is assumed that the information is transmitted/received via the communication unit 130 even in the case where there is no particular description.

The storage unit 150 is a storage area for storing various types of data temporarily or permanently. For example, data for the control device 10 to execute various functions may be recorded in the storage unit 150. As a specific example, data (for example, a library) for executing various applications, management data for managing various settings and the like, and the like may be recorded in the storage unit 150.

The input unit 120 is an input interface for the user to input various types of information to the control device 10. The input unit 220 may include an input device for the user to input information, such as a button, a switch, a touch panel, or the like, for example. For example, each of the recording button 121, the up-down button 122, the power button 123, and the menu button 124 described with reference to FIG. 2 to FIG. 6 is equivalent to an example of the input unit 120. Then, the input unit 120 outputs control information indicating manipulation contents input by the user to the control unit 140.

The output unit 110 is an output interface for the control device 10 to present various types of information to the user. The output unit 110 may include a display device that outputs image information such as a still image or a moving image, such as a so-called display or the like, for example. For example, the display unit 111 described with reference to FIG. 2 to FIG. 6 is equivalent to an example of the output unit 110. In addition, the output unit 110 may include an acoustic device that outputs sound, such as a speaker or the like, for example. In addition, the output unit 110 may include a vibration device, such as a so-called vibrator or the like, that, by vibrating in a pattern corresponding to information to be a presentation target, presents the information to the user.

The input analysis unit 141 acquires control information indicating a user input from the input unit 120, and recognizes instruction contents from the user on the basis of the acquired control information. For example, the input analysis unit 141 may specify a function associated with the button (that is, a function instructed by the user to be executed) on the basis of control information indicating manipulation contents via a button. In addition, the input analysis unit 141 may specify information selected by the user as a manipulation target among various types of information presented via the output unit 110 on the basis of control information indicating manipulation contents via a button, a touch panel, or the like. In the foregoing manner, the input analysis unit 141 recognizes the instruction contents from the user on the basis of the control information acquired from the input unit 120.

Then, in accordance with the instruction contents from the user, the input analysis unit 141 determines an output destination of information indicating the instruction contents. For example, in the case where the instruction contents from the user indicate output of information via the output unit 110, the input analysis unit 141 outputs the information indicating the instruction contents to the output control unit 143. In addition, as another example, in the case where the instruction contents from the user indicate an instruction related to control of the operation of the imaging device 20, the input analysis unit 141 transmits the information indicating the instruction contents to the imaging device 20 via the network.

The output control unit 143 is a component for controlling output of various types of information. For example, the output control unit 143 may acquire information indicating an instruction of an operation related to output of various types of information based on an input from the user from the input analysis unit 141, and on the basis of the acquired information, may cause the output unit 110 to output information instructed to be output. As a specific example, the output control unit 143 may cause the output unit 110 (for example, a display or the like) to output a manipulation menu for the user to instruct the control device 10 to execute various functions.

In addition, the output control unit 143 may cause the output unit 110 to output information indicating the state or setting of the control device 10. As a specific example, the output control unit 143 may acquire information indicating the state of communication with the imaging device 20 from the communication unit 130, and on the basis of the acquired information, may notify the user of the state of the communication via the output unit 110. In addition, as another example, the output control unit 143 may acquire information indicating the remaining battery level of the control device 10 using a system call or the like, for example, and on the basis of the acquired information, may notify the user of information (for example, a warning or the like) corresponding to the remaining battery level via the output unit 110.

In addition, the output control unit 143 may acquire various types of information from the imaging device 20 via the network, and may cause the output unit 110 to output the acquired information. For example, the output control unit 143 may acquire image data (for example, a preview image or the like) or acoustic data from the imaging device 20, and may present the acquired image data or acoustic data to the user via the output unit 110. In addition, the output control unit 143 may acquire information indicating various settings and operation modes of the imaging device 20 from the imaging device 20, and on the basis of the acquired information, may notify the user of the settings and operation modes via the output unit 110. Similarly, the output control unit 143 may acquire information indicating the state of the imaging device 20 (that is, information based on the result of monitoring the state) from the imaging device 20, and on the basis of the acquired information, may notify the user of the state of the imaging device 20 via the output unit 110.

An example of the functional configuration of the information processing system 1 according to the present embodiment has been described above with reference to FIG. 13, particularly paying attention to the functional configuration of each of the control device 10 and the imaging device 20.

1.4. Technical Characteristics

Subsequently, as technical characteristics of the information processing system 1 according to the present embodiment, an example of UIs presented by the control device 10 and the imaging device 20 will be particularly described.

1.4.1. Comparative Example

Figure 14:
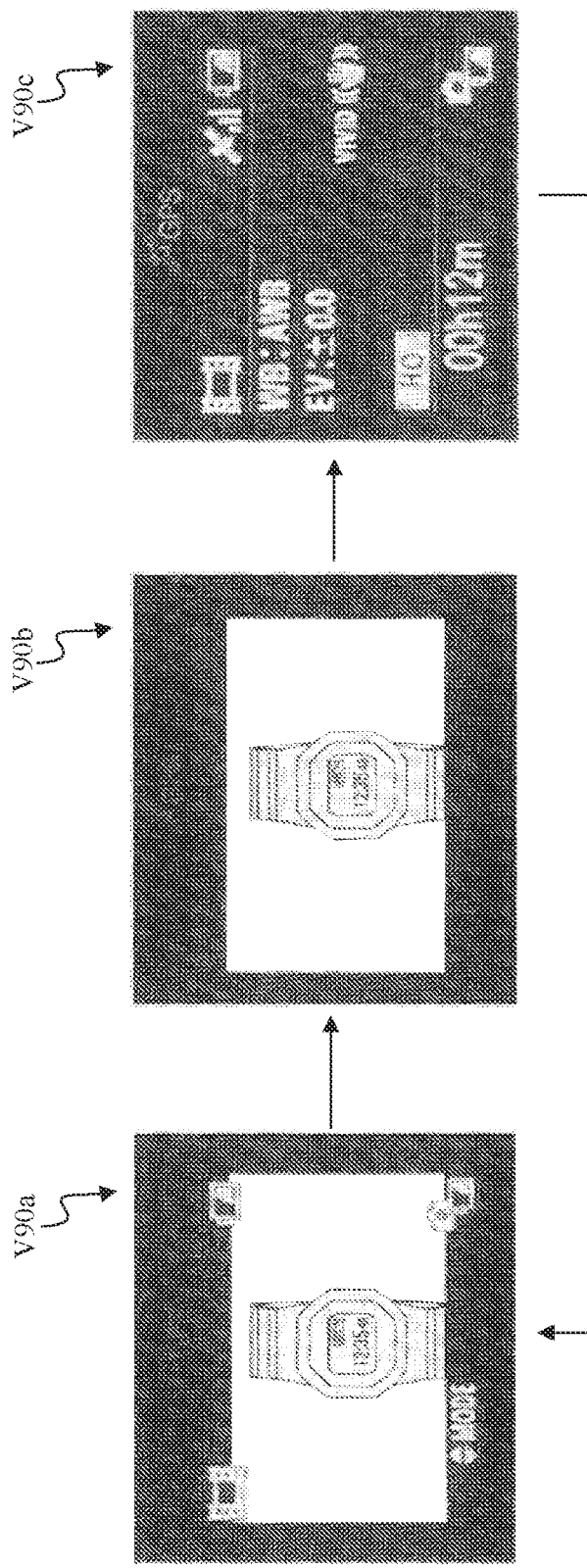
FIG. 14 is an explanatory diagram for describing an example of a UI according to a comparative example.

First, in order for easier understanding of technical characteristics of the information processing system 1 according to the present embodiment, an example of a UI for presenting an image (for example, a preview image) captured by the imaging device 20 and information indicating the setting and state of the imaging device 20 will be described as a comparative example with reference to FIG. 14. FIG. 14 is an explanatory diagram for describing an example of the UI according to the comparative example, and shows an example of the UI of the control device 10.

On the UI according to the comparative example, in the case where a predetermined button on the control device 10 side is pressed down, the screen to be displayed on the display unit 111 is switched cyclically among screens V90*a* to V90*c*, as shown in FIG. 14. For example, on the screen V90*a*, a preview image is presented, and various icons indicating the settings and states of each of the imaging device 20 and the control device 10 are superimposed on the preview image. In addition, on the screen V90*b*, presentation of various icons is restricted, and only the preview image is presented. In addition, on the screen V90*c*, by restricting presentation of the preview image, more detailed information than on the screen V90*a* is presented as information indicating the settings and states of each of the imaging device 20 and the control device 10.

On the other hand, on the UI according to the comparative example, it is necessary to restrict presentation of the preview image in order to present a specific piece of information among pieces of information indicating the settings and states of each of the imaging device 20 and the control device 10, as is understood when comparing the screen V90*a* and the screen V90*c*. In other words, on the UI according to the comparative example, it is necessary to temporarily hide the preview image in order for the user to check a specific piece of information. Thus, for example, it may be difficult for the user to perform a manipulation related to image capturing while checking both of the specific piece of information and the preview image.

Therefore, in view of the above-described circumstances, the present disclosure proposes a UI capable of presenting an image such as a preview image and various types of information (for example, setting, operation mode, state, and the like) related to image capturing in a more suitable manner.

1.4.2. UI of Control Device

First, an example of a UI of the control device 10 according to the present embodiment will be described with reference to FIG. 15 to FIG. 18. FIG. 15 to FIG. 18 are explanatory diagrams for describing an example of the UI of the control device 10 according to the present embodiment.

Figure 15:
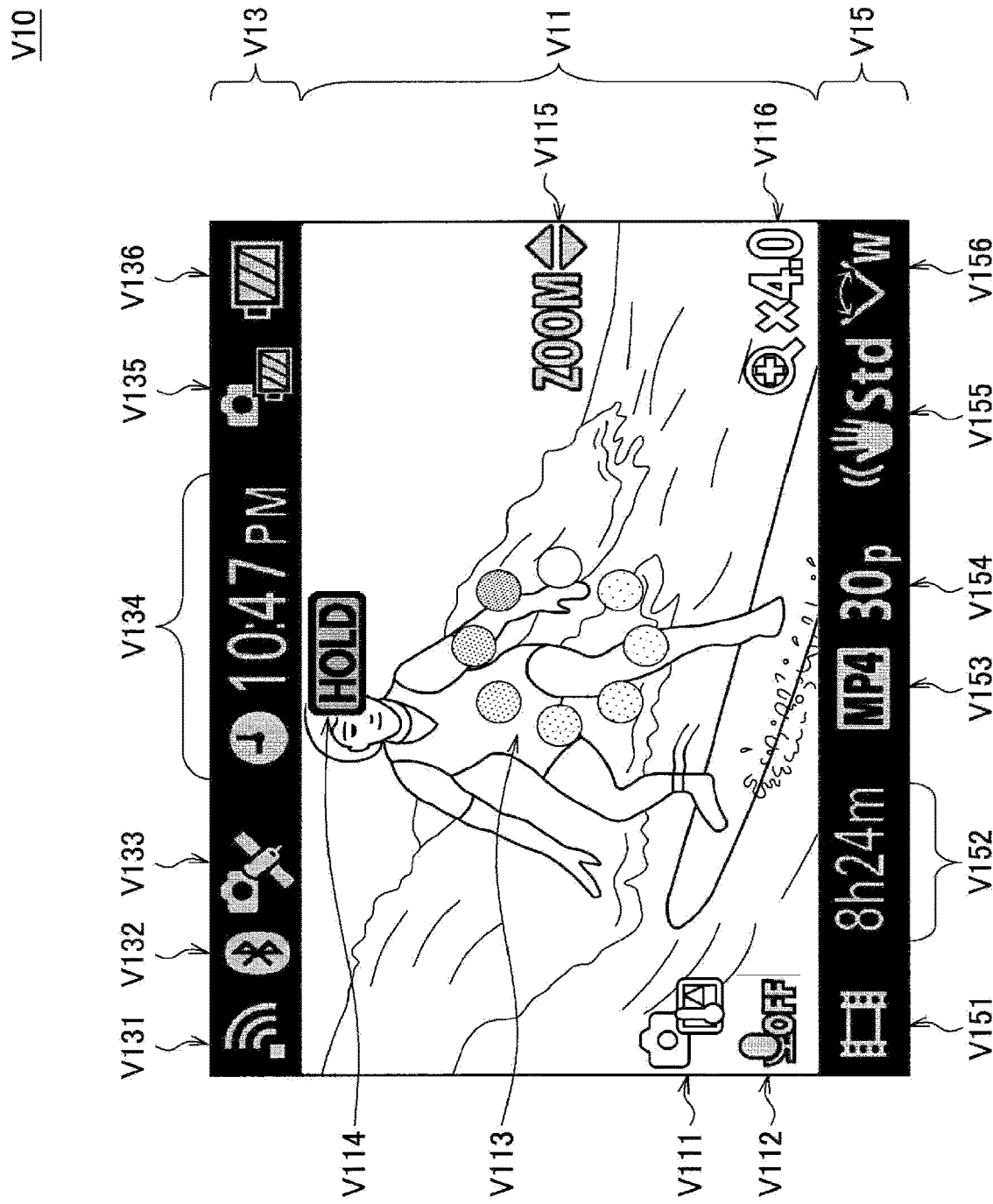
FIG. 15 is an explanatory diagram for describing an example of a UI of the control device according to the embodiment.

For example, FIG. 15 shows an example of a screen displayed as a UI on the display unit 111 of the control device 10. As shown in FIG. 15, a screen V10 displayed on the display unit 111 includes a region V11 for presenting an image (for example, a preview image) and regions V13 and V15 for presenting information corresponding to various states and settings. For example, in the example shown in FIG. 15, the strip region V13 with the lateral direction serving as the longitudinal direction is provided above the region V11. Similarly, the strip region V15 with the lateral direction serving as the longitudinal direction is provided under the region V11.

In the region V15, information indicating the settings and states related to image capturing is displayed. For example, in the example shown in FIG. 15, pieces of display information V151 to V156 are displayed in the region V15. Specifically, the display information V151 indicates the operation mode of the imaging device 20, and in the example shown in FIG. 15, indicates a mode of capturing a moving image. In addition, the display information V152 indicates the capturing time of video. In addition, the display information V153 indicates the format of video. In addition, the display information V154 indicates the mode of video (for example, the number of frames or the like), and in the example shown in FIG. 15, indicates that it is progressive video including 30 frames per second. In addition, the display information V155 indicates the setting of image stabilization. In addition, the display information V156 indicates the setting of viewing angle.

In addition, information indicating other states other than the settings and states related to image capturing is displayed in the region V13. For example, in the example shown in FIG. 15, pieces of display information V131 to V136 are displayed in the region V13. Specifically, the display information V131 indicates the state of communication with the imaging device 20 via a network based on the Wi-Fi standard. Similarly, the display information V132 indicates the state of communication with the imaging device 20 via a network based on the Bluetooth standard. In addition, the display information V133 indicates the state of a positioning function such as a global positioning system (GPS), and in the example shown in FIG. 15, indicates that the positioning result is being acquired by a GPS provided on the imaging device 20 side. In addition, the display information V133 indicates information related to the time, and in the example shown in FIG. 15, indicates the current time. Note that, as the display information V133, information related to the time other than the current time may be displayed. For example, in the case of reproducing an already captured image, information indicating the date and time when the image is captured may be displayed as the display information V133. In addition, the display information V135 indicates the remaining battery level of the imaging device 20, and the display information V136 indicates the remaining battery level of the control device 10 itself. In this manner, on the UI of the control device 10 according to the present embodiment, information on the control device 10 side and information on the imaging device 20 side may be displayed individually regarding some states and settings.

Note that, in the regions V13 and V15, information set in advance as a presentation target in accordance with the operation state of the control device 10 is displayed constantly as long as the operation state is continued. Note that the "operation state" of the control device 10 in the present description indicates a so-called operation mode to be switched intentionally in accordance with a predetermined manipulation, such as a "single mode", a "multi mode", or the like which will be described later. That is, information displayed constantly in the regions V13 and V15 may be switched in accordance with the operation state (operation mode) of the control device 10. Note that the case of expressing "displayed constantly" in the following description does not necessarily only indicate the case where information is always displayed in the same manner, but it is assumed that, for each predetermined operation state (operation mode), the case where information corresponding to the operation state is displayed constantly may also be included. In addition, the regions V13 and V15 are equivalent to an example of a "second region", and display information displayed in the regions V13 and V15 is equivalent to an example of "second information". Note that, as long as being constantly displayed in a predetermined operation state (operation mode), the second information displayed in the second region (for example, the regions V13 and V15) may be controlled to be displayed constantly only in some operation states, for example, not limited to all the operation states. In this case, for example, an operation state (operation mode) in which the second information is not displayed constantly may exist. A specific example of the operation state in which the second information is not displayed constantly includes an operation state in which a menu screen such as a manipulation menu which will be described later is displayed, for example. In addition, the second region is equivalent to an example of a "captured image hiding region". However, a so-called preview image, an actually captured image, or the like may be displayed in the second region.

A so-called preview image, an actually captured image, or the like is displayed in the region V11. In addition, in the region V11, information indicating various settings and states may be superimposed on the displayed image. For example, in the example shown in FIG. 15, pieces of display information V111 to V116 are superimposed on the image displayed in the region V11. Specifically, the display information V111 is information for warning that the temperature of the imaging device 20 indicates a value outside a predetermined range, and is displayed in accordance with the result of monitoring the temperature of the imaging device 20. In addition, the display information V112 indicates that the sound collection unit 270 of the imaging device 20 is off (that is, in a state in which sound is not collected). In addition, the display information V113 indicates that the imaging device 20 is executing processing, and that a manipulation is temporarily restricted. In addition, the display information V114 indicates that it is in a so-called hold state in which manipulations via some input units 120 (for example, a button and the like) in the control device 10 are temporarily restricted. In addition, the display information V115 indicates a manipulation assigned to the up-down button 122 shown in FIG. 2 and FIG. 4, and in the example shown in FIG. 15, indicates that a zoom manipulation in image capturing has been assigned to the up-down button 122. In addition, the display information V116 indicates a zoom magnification in image capturing.

Note that various types of information superimposed on the image displayed in the region V11 are temporarily displayed in accordance with a predetermined trigger, and are not displayed in the case where the imaging device 20 and the control device 10 itself are in a standard state. Note that the standard state shall indicate a state used as a reference of an operation, such as a state in which an anomaly such as a temperature increase is not sensed, a state in which a default setting has been applied, or the like, for example. More specifically, the display information V111 is displayed only in the case where a temperature anomaly of the imaging device 20 is detected. In addition, the display information V112 is not displayed in the case where the sound collection unit 270 of the imaging device 20 is on. In addition, the display information V113 is displayed only in the case where the imaging device 20 is executing processing. In addition, the display information V114 is displayed only in the case of the hold state. In addition, the display information V115 is displayed temporarily just after a manipulation is performed on the up-down button 122, and is hidden in the case where the state in which a manipulation on the up-down button 122 is not detected has continued for a predetermined period. In addition, the display information V116 is displayed as information indicating the set magnification only in the case where the zoom magnification has been set at another value other than 1.0. In addition, the region V11 is equivalent to an example of a "first region", and display information superimposed on the image displayed in the region V11 is equivalent to an example of "first information". In addition, the first region is equivalent to an example of a "captured image display region".

Note that the contents of the "predetermined trigger" are not particularly limited as long as it starts a transition to another state different from the standard state. A specific example of the "predetermined trigger" includes an event in which another state different from the standard state occurs along with sensing, predetermined input information to be input for causing a transition to another state different from the standard state, and the like, for example. In addition, "temporary display" means that, different from constant display, display is not presented in the standard state, but display is presented in the case where a transition is made to another state, for example. In addition, a trigger to hide information temporarily displayed is not particularly limited. For example, information "temporarily" displayed along with the occurrence of a predetermined situation may be controlled to be hidden along with the end of the situation, or may be controlled to be hidden after the lapse of a certain time from the occurrence of the situation. Note that, even in the case where the aforementioned second region (for example, the regions V13 and V15) is displayed constantly in a predetermined operation state (operation mode), information (for example, a preview image or first information) may be displayed in the first region (for example, the region V11), or may not be displayed. In addition, at this time, the state in which information is displayed and the state in which information is not displayed may be switched dynamically in the first region. In other words, the first information (the display information V111 to V116 or the like) is displayed in accordance with the second information (the display information V131 to V136, V151 to V156, or the like) being displayed, and the imaging device 20 and the control device 10 itself being in a predetermined state (that is, another state different from the standard state). That is, the first information is displayed only under certain conditions, whereas the second information is displayed constantly in accordance with an operation state. Thus, the display frequency of the first information is lower than the display frequency of the second information.

Figure 16:
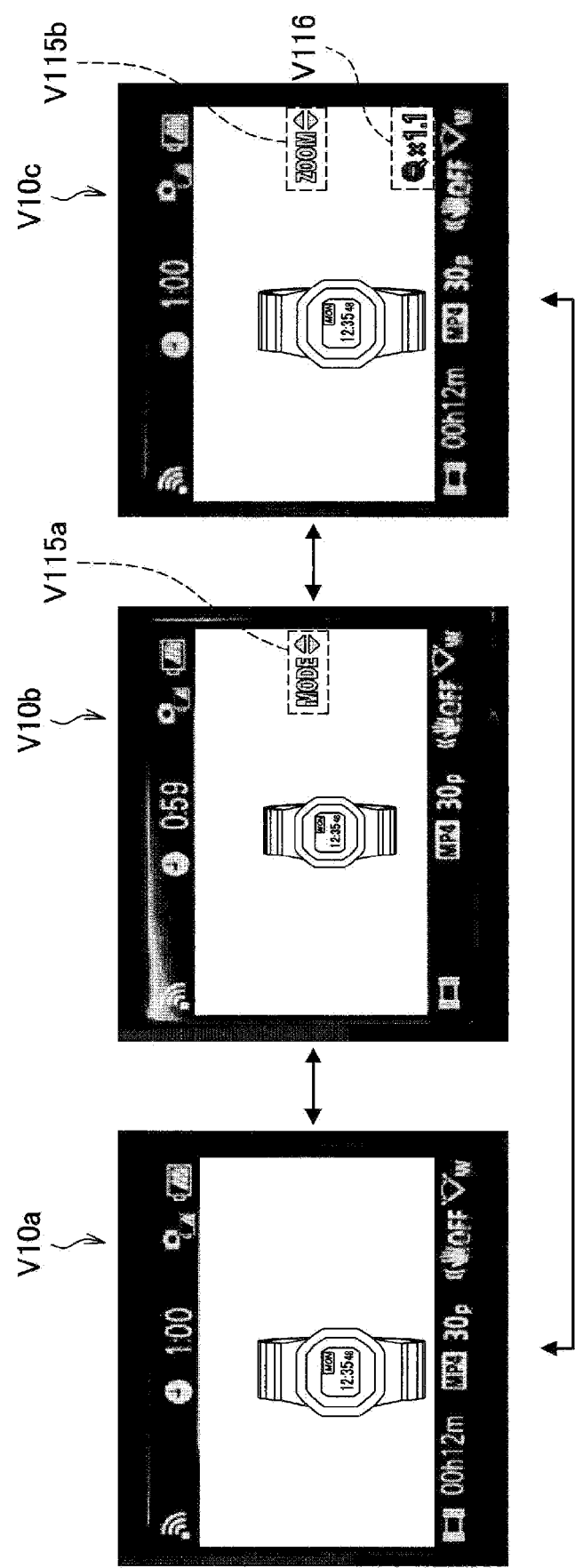
FIG. 16 is an explanatory diagram for describing an example of a UI of the control device according to the embodiment.

Here, with reference to FIG. 16, an example of an operation of the UI of the control device 10 according to the present embodiment will be described particularly paying attention to an operation related to display of information. FIG. 16 is an explanatory diagram for describing an example of the operation of the UI of the control device 10 according to the present embodiment.

In FIG. 16, a screen denoted by a reference character V10a shows an example of a screen presented in the standard state. That is, in the standard state, information indicating various states and settings is not superimposed on an image displayed in the region V11, as shown as the screen V10a.

In addition, a screen denoted by a reference character V10b shows an example of a screen in the case where a manipulation on the up-down button 122 has been detected. In the example shown as the screen V10b, display information V115a indicating that a manipulation for switching the mode has been assigned to the up-down button 122 is displayed. Note that, in the case where the state in which a manipulation on the up-down button 122 is not detected has continued for a predetermined period in the state where the screen V10b is displayed, the display information V115a is hidden.

In addition, a screen denoted by a reference character V10c shows another example of a screen in the case where a manipulation on the up-down button 122 has been detected. In the example shown as the screen V10c, display information V115b indicating that a zoom manipulation in image capturing has been assigned to the up-down button 122 is displayed. In addition, since the zoom magnification has been set at 1.1 in the example shown as the screen V10c, the display information V116 indicating the magnification is displayed. Note that, in the case where the zoom magnification is changed to 1.0 (default value), the display information V116 is hidden. In addition, in the case where the state in which a manipulation on the up-down button 122 is not detected has continued for a predetermined period in the state where the screen V10c is displayed, the display information V115b is hidden.

In addition, as shown in FIG. 16, in any of the cases of the screens V10a to V10c, information correlated in advance is displayed constantly in a predetermined layout in each of the regions V13 and V15.

Note that, among pieces of display information displayed on the screen V10, display information associated in advance with an input interface such as a button provided for the control device 10 may be controlled in display position so as to be positioned close to the input interface.

Figure 17:
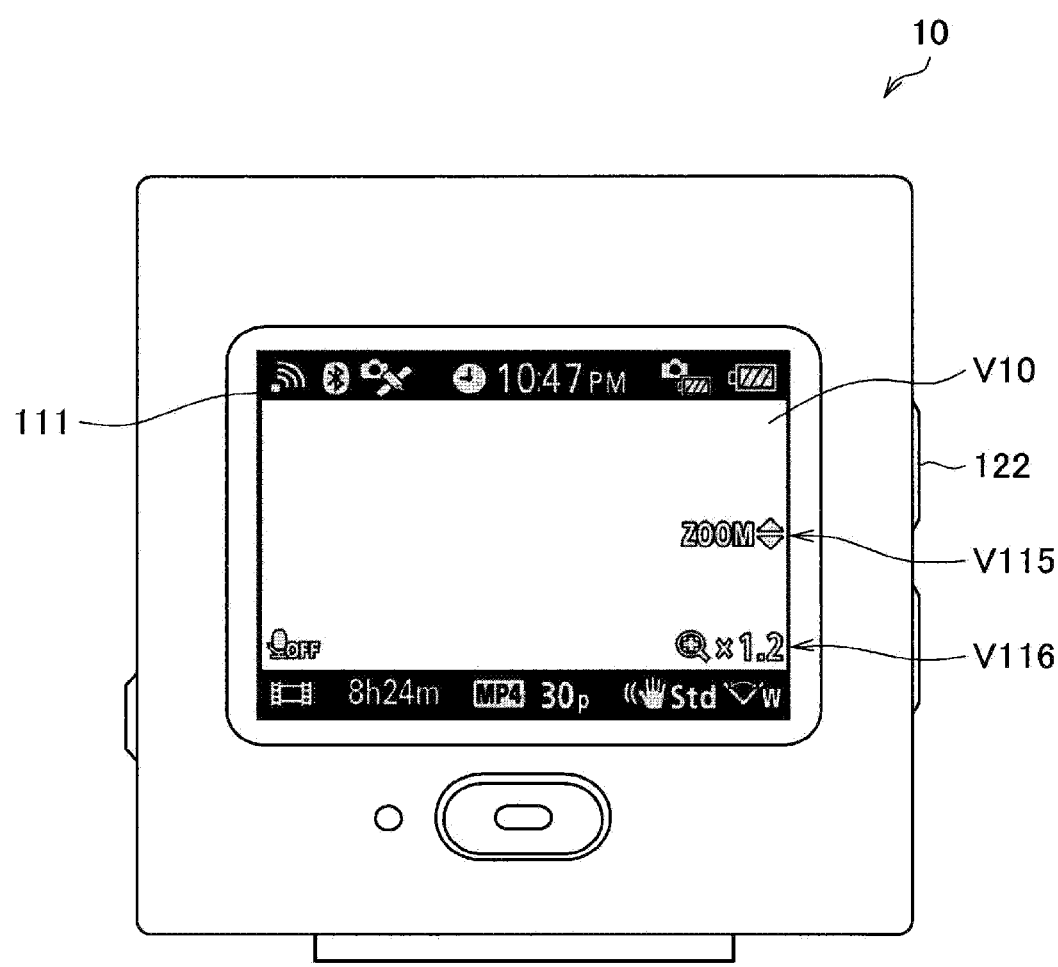
FIG. 17 is an explanatory diagram for describing an example of a UI of the control device according to the embodiment.

For example, FIG. 17 is an explanatory diagram for describing the display position of the display information V115 indicating a manipulation assigned to the up-down button 122. As described with reference to FIG. 2 and FIG. 4, the up-down button 122 is provided on the right side surface of the housing 11 of the control device 10. On the basis of such a configuration, the display information V115 is presented in a region positioned closer to the up-down button 122 in the screen V10. For example, in the example shown in FIG. 17, the display information V115 is displayed on the right end side of the screen V10. Note that, at this time, information indicating the setting based on the manipulation indicated by the display information V115, such as the display information V116, may be displayed in a region positioned close to the up-down button 122 (for example, on the right end side of the screen V10 in FIG. 17), similarly to the display information V115.

In addition, display of the display information V115 and V116 and the manipulating direction indicated by the display information V115 may be controlled such that the direction (manipulating direction) indicated by the display information V115 and the manipulating direction (that is, the vertical direction) of the up-down button 122 substantially match. For example, in the example shown in FIG. 17, the display information V115 indicates that the zoom magnification can be manipulated by a manipulation in the vertical direction. At this time, in the case where the upper side of the up-down button 122 is pressed down, the zoom magnification is controlled to become larger, and along with the control, the display information V116 is updated. In addition, in the case where the lower side of the up-down button 122 is pressed down, the zoom magnification is controlled to become smaller, and along with the control, the display information V116 is updated.

Note that the control device 10 may be configured such that the orientation in which the screen V10 is displayed can be controlled in such a manner that the top and the bottom of the screen V10 are reversed with respect to the top and the bottom of the housing 11. For example, FIG. 18 shows an example of the case where the screen V10 is displayed in such a manner that the top and the bottom of the screen V10 are reversed with respect to the top and the bottom of the housing V11. Here, in the example shown in FIG. 18, in the case where the user is diametrically opposed to the screen V10, the up-down button 122 is positioned on the left side of the screen V10 as seen from the user. Thus, in the example shown in FIG. 18, the display information V115 and V116 may be controlled in display position so as to be displayed on the left end side of the screen V10.

An example of the UI of the control device 10 according to the present embodiment has been described above with reference to FIG. 15 to FIG. 18. Note that the example described above is a mere example, and the example described with reference to FIG. 15 to FIG. 18 is not necessarily a limitation. For example, as long as the first region (for example, the region V11) and the second region (for example, the regions V13 and V15) are presented separately, the configuration of the screen V10 is not necessarily limited to the example shown in FIG. 15. For example, only either of the regions V13 and V15 may be presented. In addition, a strip second region with the vertical direction serving as the longitudinal direction may be provided on either or both of the left and right of the first region. In addition, a semi-transparent second region may be presented on the first region.

1.4.3. Specific Example of Display Information

Next, with reference to FIG. 15 and FIG. 19 to FIG. 23, a specific example of display information displayed in each of the regions V11, V13, and V15 in the screen V10 will be described. FIG. 19 to FIG. 23 are explanatory diagrams for describing an example of display information to be displayed on the UI according to the present embodiment.

For example, FIG. 19 shows an example of the display information V151 indicating the operation mode of the imaging device 20 to be displayed in the region V15 in the screen V10 shown in FIG. 15. Examples of the operation mode of the imaging device 20 include modes such as video capturing, still image capturing, interval shooting, loop recording, live streaming, and audio, as shown in FIG. 19. Note that the interval shooting is a mode of capturing a still image at each interval set in advance. In addition, the loop recording is a mode for capturing a moving image within the range of a capturing time determined in advance, and in the case where a moving image is captured beyond the capturing time, a moving image (frame) captured in the past is deleted. With such a configuration, during the loop recording, a moving image captured more recently is held by priority within the range of the capturing time determined in advance. In addition, the live streaming is an operation mode for encoding a captured image or collected sound (voice) in real time and distributing streams. In addition, the audio mode is an operation mode for collecting acoustic data alone.

In addition, FIG. 20 shows another example of display information to be displayed in the region V15 in the screen V10 shown in FIG. 15. As described earlier, information indicating the states and settings related to image capturing is displayed in the region V15. Specifically, pieces of information indicating viewing angle setting, an image stabilization mode, a state indicating effectiveness and ineffectiveness of image stabilization, a video format, an interval timer, a state of medium, and the like are displayed in the region V15 as shown in FIG. 20.

In addition, FIG. 21 shows an example of display information to be displayed in the region V13 in the screen V10 shown in FIG. 15. As described earlier, information indicating another state other than the states and settings related to image capturing is displayed in the region V13. Specifically, pieces of information indicating a mode of communication (for example, the single mode and the multi mode) based on the Wi-Fi standard, a state of communication based on the Bluetooth standard, a state of a positioning function such as GPS, a setting situation of an airplane mode, the remaining battery level of the control device 10, the remaining battery level of the imaging device 20, and the like are displayed in the region V13 as shown in FIG. 21.

Note that the single mode among the communication modes based on the Wi-Fi standard is a mode in which the control device 10 and the imaging device 20 are connected in a one-to-one manner as shown in FIG. 1. In addition, the multi mode is a mode in which a plurality of imaging devices 20 are connected to the control device 10. In the multi mode, it is possible to check the state of each of the plurality of imaging devices 20 via the control device 10, and to control the setting and operation of each of the plurality of imaging devices 20 via the control device 10. Note that an example of the multi mode will be described later separately as a second embodiment.

In addition, FIG. 22 shows an example of display information to be superimposed on an image displayed in the region V11 in the screen V10 shown in FIG. 15. Specifically, in the region V11, a warning indicating a state anomaly such as a temperature anomaly or the like, information indicating a state in which some functions or manipulations are restricted, such as during execution of processing or during holding, or the like is displayed. In addition, in the region V11, information explicitly indicating that a setting different from the default state (for example, the standard state) has been made, such as a state in which some functions have been disabled (that is, have been turned off) or the like, may be displayed.

Figures 23, 24:
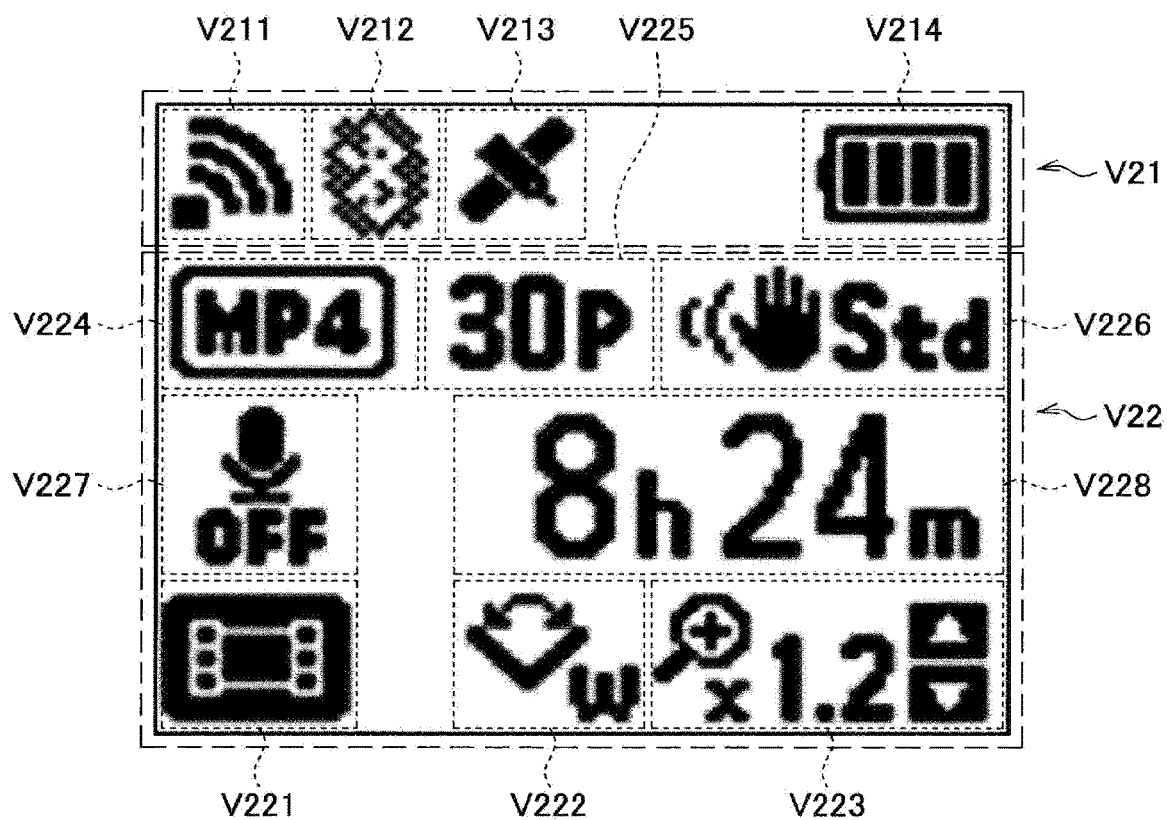
FIG. 23 is an explanatory diagram for describing an example of display information to be displayed on the UI according to the embodiment.
FIG. 24 is an explanatory diagram for describing an example of a UI of the imaging device according to the embodiment.

In addition, FIG. 23 shows an example of the display information V115 indicating a manipulation assigned to the up-down button 122 to be superimposed on an image displayed in the region V11 in the screen V10 shown in FIG. 15. Examples of the manipulation assigned to the up-down button 122 include zoom control, mode switching, switching of an imaging device to be a control target in the multi mode, and the like. In addition, in the case where a manipulation via the up-down button 122 is temporarily restricted, information indicating that the manipulation is restricted may be displayed as the display information V115.

A specific example of display information to be displayed in each of the regions V11, V13, and V15 in the screen V10 has been described above with reference to FIG. 15 and FIG. 19 to FIG. 23.

1.4.4. UI of Imaging Device

Subsequently, an example of a UI of the imaging device 20 according to the present embodiment will be described with reference to FIG. 24, particularly paying attention to a screen presented on the display unit 211 of the imaging device 20. FIG. 24 is an explanatory diagram for describing an example of the UI of the imaging device 20 according to the present embodiment.

As shown in FIG. 24, a screen V20 displayed on the display unit 211 includes a region V21 and a region V22. The region V22 is a region for displaying information indicating the settings and states related to image capturing performed by the imaging device 20. In addition, the region V21 is a region for displaying information indicating other states other than the settings and states related to image capturing performed by the imaging device 20.

For example, in the example shown in FIG. 24, pieces of display information V221 to V228 are displayed in the region V22, and are equivalent to the display information V151 to V156, V112, V115, and V116 on the screen V10 (see FIG. 15) of the control device 10, respectively. More specifically, the display information V221 indicates the operation mode of the imaging device 20, and is equivalent to the display information V151 on the screen V10. In addition, the display information V222 indicates the setting of a viewing angle, and is equivalent to the display information V156 on the screen V10. In addition, the display information V223 indicates the zoom magnification in image capturing, and is equivalent to the display information V115 and V116 on the screen V10. In addition, the display information V224 indicates the format of video, and is equivalent to the display information V153 on the screen V10. In addition, the display information V225 indicates the mode of video (for example, the number of frames or the like), and is equivalent to the display information V154 on the screen V10. In addition, the display information V226 indicates the setting of image stabilization, and is equivalent to the display information V155 on the screen V10. In addition, the display information V227 indicates that the sound collection unit 270 of the imaging device 20 is off (that is, in a state in which sound is not collected), and is equivalent to the display information V112 on the screen V10. In addition, the display information V228 indicates the capturing time of video, and is equivalent to the display information V152 on the screen V10.

In addition, in the example shown in FIG. 24, pieces of display information V211 to V214 are displayed in the region V21, and are equivalent to the display information V131 to V133 and V135 on the screen V10 (see FIG. 15) of the control device 10, respectively. More specifically, the display information V211 indicates the state of communication with the control device 10 via a network based on the Wi-Fi standard, and is equivalent to the display information V131 on the screen V10. In addition, the display information V212 indicates the state of communication with the control device 10 via a network based on the Bluetooth standard, and is equivalent to the display information V132 on the screen V10. In addition, the display information V213 indicates the state of a positioning function such as GPS, and is equivalent to the display information V133 on the screen V10. In addition, the display information V214 indicates the remaining battery level of the imaging device 20, and is equivalent to the display information V135 on the screen V10. Note that, in the region V21, display information indicating a temperature anomaly of the imaging device 20 equivalent to the display information V111 on the screen V10 may be displayed.

Note that, as shown in FIG. 24, as display information displayed on each of the regions V21 and V22 of the screen V20, display information with similar motifs to display information displayed on the screen V10 is used. In addition, on the screen V20, similarly to the screen V10 (see FIG. 15) of the control device 10, the region V22 in which information indicating the settings and states related to image capturing performed by the imaging device 20 is displayed is positioned on the lower side of the screen, and the region V21 in which information indicating other states is displayed is positioned on the upper side of the screen. With such a configuration, it is possible for the user to intuitively recognize the position at which desired information is displayed also in the case of checking the screen V20 of the imaging device 20 with a similar sense to the case of checking the screen V10 of the control device 10.

In addition, the zoom magnification in image capturing presented as the display information V223 is changed by a manipulation via the upper button 222 and the lower button 223 described with reference to FIG. 10. That is, the correspondence of the display information V223 with the upper button 222 and the lower button 223 is similar to the correspondence between the display information V115 and the up-down button 122 in the control device 10. Thus, the display information V223 is displayed in a region positioned close to the upper button 222 and the lower button 223 on the screen V20 (that is, on the right end side of the screen V20), similarly to the display information V115 on the screen V10 of the control device 10. Thus, it is possible for the user to intuitively manipulate the zoom magnification via the upper button 222 and the lower button 223 of the imaging device 20 with a similar sense to the case of manipulating the zoom magnification via the up-down button 122 of the control device 10.

Note that, in the case where the imaging device 20 is connected to the control device 10 via the network, regarding some manipulations, a manipulation via the control device 10 may only be enabled, and a manipulation via the input interface of the imaging device 20 may be restricted in order to prevent an incorrect manipulation. As a specific example, regarding the manipulation of the zoom magnification of the imaging device 20, a manipulation via the up-down button 122 of the control device 10 may be enabled, and a manipulation via the upper button 222 and the lower button 223 of the imaging device 20 may be disabled.

An example of the UI of the imaging device 20 according to the present embodiment has been described above with reference to FIG. 24, particularly paying attention to the screen presented on the display unit 211 of the imaging device 20. Note that the screen V20 shown in FIG. 24 is a mere example, and the UI of the imaging device 20 is not necessarily limited only to the screen V20. As a specific example, a screen (that is, a screen including regions equivalent to the regions V11, V13, and V15) having a similar layout to the screen V10 (see FIG. 15) and the control device 10 may be presented as the UI of the imaging device 20.

1.4.5. Configuration of Manipulation Menu

Subsequently, an example of manipulation menus of the control device 10 and the imaging device 20 according to the present embodiment will be described with reference to FIG. 25 and FIG. 26. Here, the manipulation menus are UIs for selectively executing various functions (for example, changing of setting, execution of processing, and the like) of the control device 10 and the imaging device 20.

Figure 25:
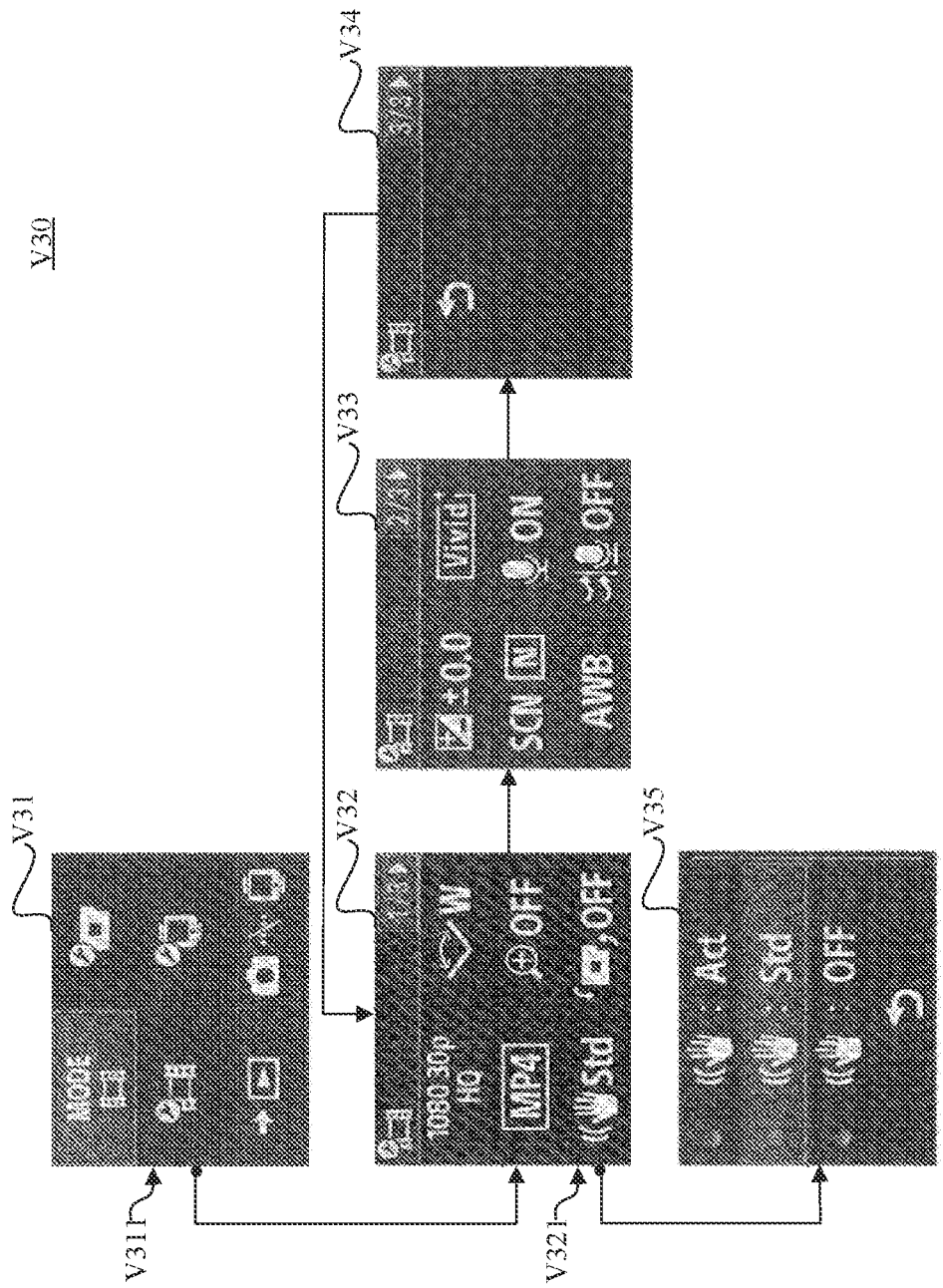
FIG. 25 is an explanatory diagram for describing an example of a manipulation menu of the control device according to the embodiment.

For example, FIG. 25 is an explanatory diagram for describing an example of a manipulation menu V30 of the control device 10 according to the present embodiment. The manipulation menu V30 shown in FIG. 25 is displayed on the display unit 111 in the case where the menu button 124 described with reference to FIG. 2 and FIG. 4 is pressed down, for example. Specifically, when the menu button 124 is pressed down, a screen V31 is displayed first.

In the manipulation menu V30, various functions of the control device 10 and the imaging device 20 are classified in advance in accordance with the type and target, and a manipulation screen for executing each of the functions is managed for each of the classes. For example, in the example shown in FIG. 25, various functions of the control device 10 and the imaging device 20 are classified into "mode switching", "setting related to image capturing", "image reproduction", "setting of imaging device", "setting of control device", and "communication between imaging device and control device", and managed. Thus, on the screen V31, display information (for example, an icon) indicating the class of each of "mode switching", "setting related to image capturing", "image reproduction", "setting of imaging device", "setting of control device", and "communication between imaging device and control device" is presented. By manipulating a predetermined button such as the up-down button 122 or the recording button 121, for example, to select display information corresponding to a desired class among respective pieces of presented display information, the user can instruct the control device 10 to display a manipulation screen for the function assigned to the class. Note that the present description will be made assuming that display information associated with "setting related to image capturing" indicated by a reference character V311 has been selected.

When the display information V311 is selected, the screens V32 to V34 for selecting respective functions classified as "setting related to image capturing" are displayed on the display unit 111. On the screens V32 to V34, display information indicating the respective functions classified as "setting related to image capturing" is displayed. For example, on the screen V32, display information indicating functions of checking and changing the setting of each of "resolution and number of frames", "image format", "image stabilization", "viewing angle", "zoom magnification", and "turning of screen corresponding to orientation of imaging device" is presented. In addition, on the screen V33, display information indicating functions of checking and changing the setting of each of "exposure (brightness of captured image)", "screen size", "auto white balance", "screen effect", "on/off of speaker", and "noise cancelling function of speaker" is presented. By manipulating a predetermined button such as the up-down button 122 or the recording button 121 and switching the screen among the screens V32 to V34 to select display information associated with a desired function, the user can instruct the control device 10 to display a manipulation screen for the function.

Note that, as display information displayed on the screens V32 to V34, motifs similar to the display information to be displayed on the screen V10 described with reference to FIG. 15 are used. Thus, it is possible for the user to intuitively recognize to which setting each piece of display information is related.

With the configuration as described above, when the display information indicating the function of checking and changing the setting of "image stabilization" indicated by a reference character V321 on the screen V32 is selected, for example, a screen V35 for checking and changing the setting of "image stabilization" is displayed. Then, by selecting display information associated with a desired set value from among pieces of display information associated with the respective set values of "image stabilization" presented on the screen V35, the setting of "image stabilization" is changed.

In the above manner, on the manipulation menu V30, the respective screens are associated hierarchically in accordance with the class. With such a configuration, by selecting display information displayed on the screen as appropriate in accordance with an object to cause a manipulation screen corresponding to a desired function to be displayed, and performing a manipulation in accordance with the manipulation screen, it is possible for the user to cause the control device 10 to execute the function.

Next, an example of a manipulation menu V40 of the imaging device 20 according to the present embodiment will be described with reference to FIG. 26. The manipulation menu V40 shown in FIG. 26 is displayed on the display unit 211 in the case where the menu button 225 described with reference to FIG. 10 is pressed down, for example.

Figure 26:
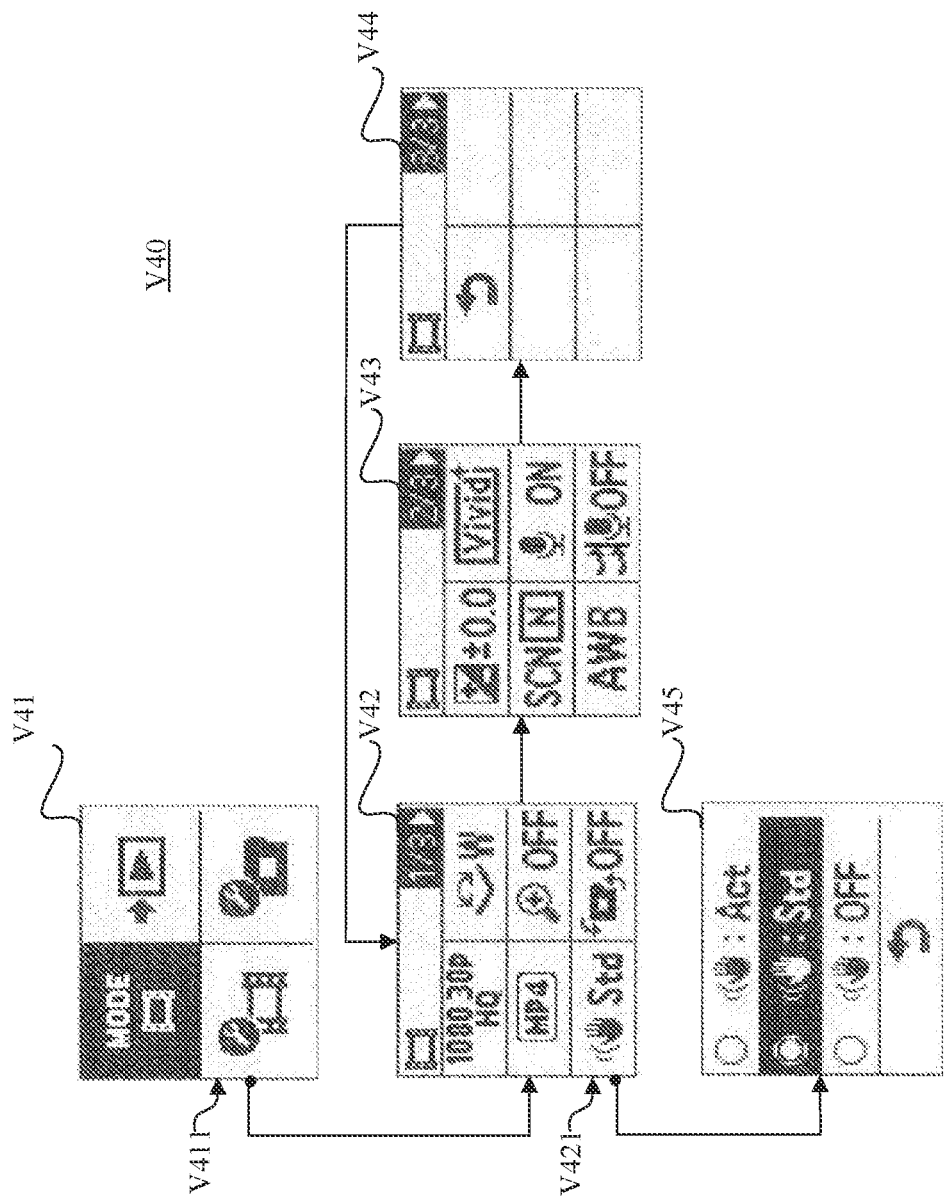
FIG. 26 is an explanatory diagram for describing an example of a manipulation menu of the imaging device according to the embodiment.

Note that, as is understood when comparing FIG. 26 and FIG. 25, the manipulation menu V40 has a similar screen configuration to the manipulation menu V30 of the control device 10 except that display information (for example, an icon or the like) is not displayed for a function not existing on the imaging device 20 side. That is, a screen V41 in the manipulation menu V40 is equivalent to the screen V31 in the manipulation menu V30. Similarly, screens V42 to V45 in the manipulation menu V40 are equivalent to the screens V32 to V35 in the manipulation menu V30. In addition, also for display information (an icon or the like) displayed on each of the screens V41 to V45 in the manipulation menu V40, similar motifs to the display information displayed on each of the screens V31 to V35 in the manipulation menu V30 are used.

With such a configuration, it is possible for the user to intuitively manipulate the manipulation menu V40 of the imaging device 20 with a similar sense to the case of manipulating the manipulation menu V30 of the control device 10.

An example of the manipulation menus of the control device 10 and the imaging device 20 according to the present embodiment has been described above with reference to FIG. 25 and FIG. 26.

1.5. Evaluation

As described above, the screen V10 presented as the UI of the control device 10 according to the present embodiment includes the region V11 for presenting an image, and the regions V13 and V15 for presenting information corresponding to various states and settings, as shown in FIG. 15. In the regions V13 and V15, information set in advance as a presentation target in accordance with the operation state (operation mode) of the control device 10 is displayed constantly in a predetermined layout as long as the operation state is continued. On the other hand, various types of information superimposed on an image displayed in the region V11 is temporarily displayed in accordance with a predetermined trigger, such as the case where a state in which image capturing is difficult has been detected, for example, and is not displayed in the case where the imaging device 20 and the control device 10 are in the standard state.

With such a configuration, for example, it is possible for the user to instruct the imaging device 20 to capture an image such as a moving image or a still image via the control device 10 while checking both of a preview image and various types of information (for example, setting, operation mode, state, and the like) related to image capturing. In addition, in the standard state, information is not superimposed on the image displayed in the region V11, and thus, the occurrence of such a situation in which a part of the image is shielded by the information is suppressed. That is, it is possible for the user to capture an image in a more suitable environment.

In addition, in the case where a transition is made to a state different from the standard state, such as a temperature anomaly of the imaging device 20 or the like, information (for example, a warning or the like) indicating the state different from the standard state, which is hidden in the standard state, is superimposed on the image displayed in the region V11. With such a configuration, it is possible to raise user awareness that a transition is being made to a state different from the standard state (for example, an abnormal state is being sensed).

In addition, among pieces of display information displayed on the screen V10 of the control device 10, display information associated in advance with the input interface such as a button provided for the control device 10 may be controlled in display position so as to be positioned close to the input interface. This also applies to the case of turning the housing 11 of the control device 10 such that the top and the bottom of the screen V10 are reversed. With such a configuration, even if the user turns the screen V10 with respect to the housing 11 such that it is easier to manipulate a predetermined input interface with his/her own dominant hand, display information associated with the input interface is displayed close to the input interface. Thus, it is possible for the user to perform a more intuitive manipulation corresponding to his/her usage form.

In addition, in the present embodiment, display information with similar motifs to display information displayed on the screen V10 (see FIG. 15) of the control device 10 is used as display information to be displayed on the screen V20 (see FIG. 24) of the imaging device 20. In addition, on the screen V20, the region V22 in which information indicating the settings and states related to image capturing performed by the imaging device 20 is displayed is positioned on the lower side of the screen, and the region V21 in which information indicating other states is displayed is positioned on the upper side of the screen, similarly to the screen V10 of the control device 10. With such a configuration, also in the case of checking the screen V20 of the imaging device 20, it is possible for the user to intuitively recognize the position at which desired information is displayed with a similar sense to the case of checking the screen V10 of the control device 10.

In addition, in the present embodiment, the manipulation menu V30 (FIG. 25) of the control device 10 and the manipulation menu V40 (FIG. 26 and) of the imaging device 20 have a similar screen configuration, and display information with similar motifs is used as display information to be displayed on each of the screens. With such a configuration, it is possible for the user to perform an intuitive manipulation with a similar sense both in the case of manipulating the manipulation menu V40 of the imaging device 20 and in the case of manipulating the manipulation menu V30 of the control device 10.

2. Second Embodiment

Next, as a second embodiment of the present disclosure, an example of the UI of the control device 10 in the aforementioned multi mode (that is, a mode in which a plurality of imaging devices 20 are connected to the control device 10) will be described.

2.1. System Configuration

Figure 27:
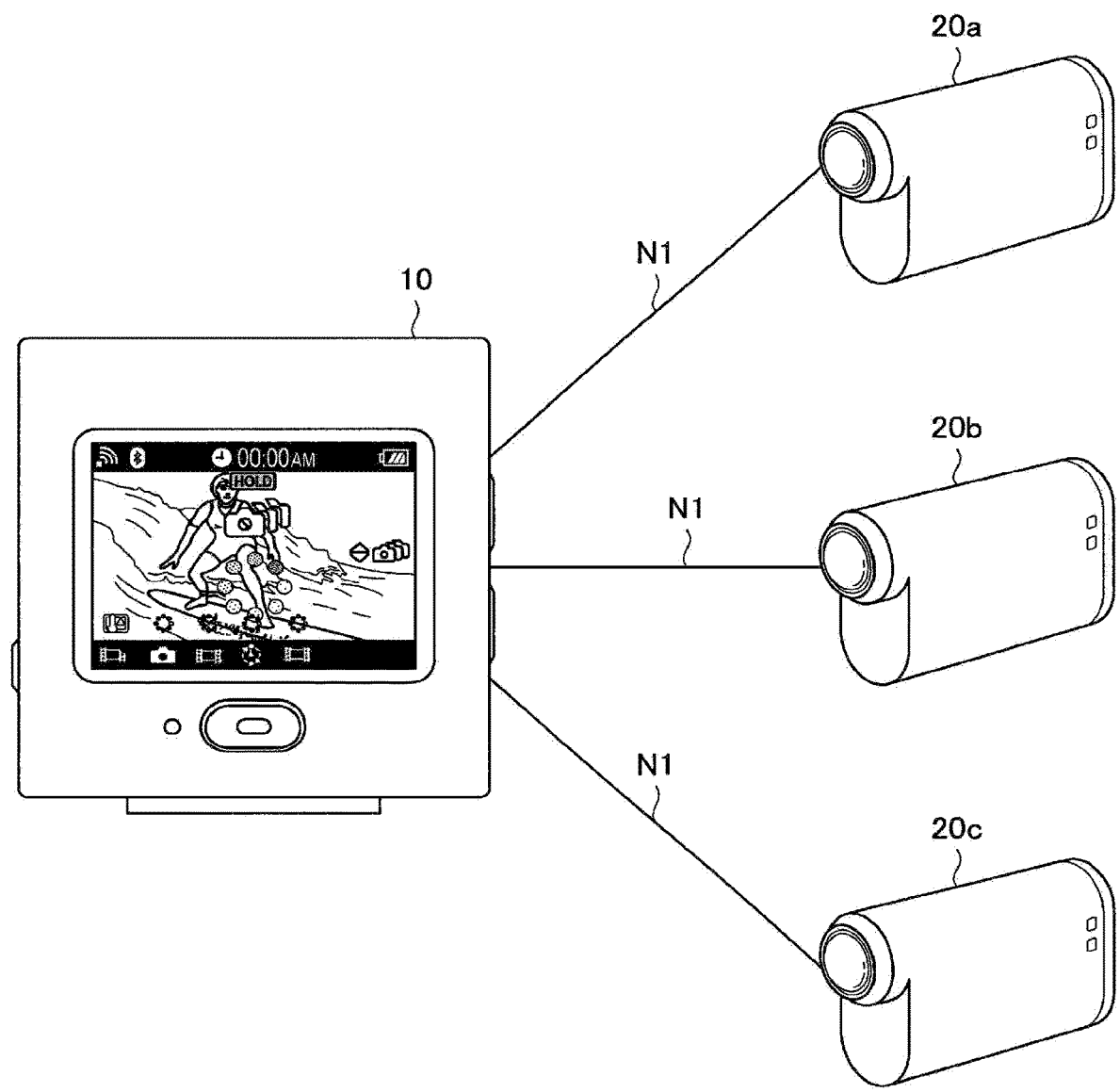
FIG. 27 is an explanatory diagram for describing an example of a schematic system configuration of an information processing system according to a second embodiment of the present disclosure.

First, an example of a system configuration of an information processing system 2 according to the present embodiment will be described with reference to FIG. 27. FIG. 27 is an explanatory diagram for describing an example of a schematic system configuration of the information processing system 2 according to the present embodiment, and shows an example of a system configuration during the operation in the multi mode.

As shown in FIG. 27, in the information processing system 2 according to the present embodiment, the control device 10 and each of the plurality of imaging devices 20 are connected so as to be capable of communicating with each other via the wireless network N1. For example, in the example shown in FIG. 27, each of imaging devices 20a to 20b is connected to the control device 10 via the network N1. More specifically, in the case of applying the network N1 based on the Wi-Fi standard, it is possible to achieve a communication form as shown in FIG. 27 by causing the control device 10 to operate as an access point and connecting each of the imaging devices 20a to 20c as a station to the control device 10.

Note that communication between the control device 10 and the imaging devices 20a to 20c via the network N1 can be connected and disconnected individually on the basis of a standard such as Wi-Fi or the like, for example. Thus, for example, it is also possible to dynamically increase or decrease the number of the imaging devices 20 to be connected to the control device 10.

On the basis of such a configuration, the control device 10 is configured to be capable of controlling the operation (for example, the operation related to image capturing) of each of the imaging devices 20a to 20c connected via the network N1. At this time, the control device 10 may individually control the operation of each of the imaging devices 20a to 20c via the network N1. In addition, the control device 10 may collectively control the operation of each of the imaging devices 20a to 20c via the network N1.

In addition, the control device 10 may present an image (for example, a preview image) captured by at least any imaging device 20 among the imaging devices 20a to 20c and transmitted from the imaging device 20 via the network N1 to the user via the display unit 111. In addition, the control device 10 may acquire information indicating the setting and state of each of the imaging devices 20a to 20c from each of the imaging devices 20a to 20c via the network N1, and may present the acquired information to the user via the display unit 111.

An example of the schematic system configuration of the information processing system according to the second embodiment of the present disclosure has been described above with reference to FIG. 27.

2.2. Technical Characteristics

Figure 28:
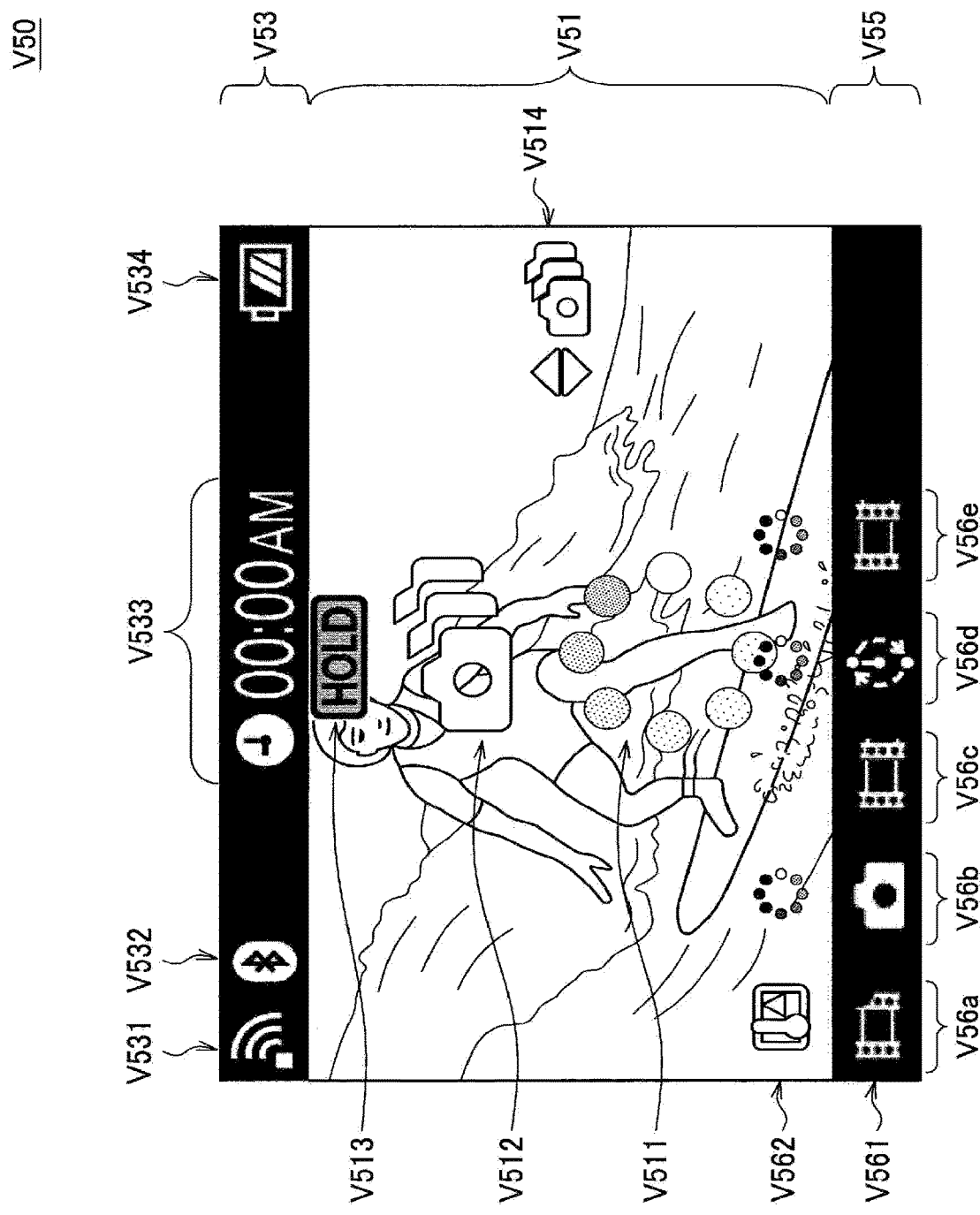
FIG. 28 is an explanatory diagram for describing an example of a UI of a control device according to the embodiment.

Next, as technical characteristics of the information processing system 2 according to the present embodiment, an example of a UI presented by the control device 10 during the operation in the multi mode will be particularly described with reference to FIG. 28. FIG. 28 is an explanatory diagram for describing an example of the UI of the control device 10 according to the present embodiment, and shows an example of a screen displayed as a UI on the display unit 111 of the control device 10. Note that, in the present description, it is assumed that each of the imaging devices 20a to 20e is connected to the control device 10 via the network N1.

As shown in FIG. 28, a screen V50 displayed on the display unit 111 includes a region V51 for presenting an image (for example, a preview image), and regions V53 and V55 for presenting information corresponding to various states, settings, and the like. For example, in the example shown in FIG. 28, the strip region V53 with the lateral direction serving as the longitudinal direction is provided above the region V51. Similarly, the strip region V55 with the lateral direction serving as the longitudinal direction is provided under the region V51. Such a configuration is similar to the configuration (that is, the positional relationship among the regions V11, V13, and V15) of the screen V10 of the control device 10 according to the first embodiment described with reference to FIG. 15.

In the region V53, information indicating other states other than the settings and states related to image capturing is displayed. Note that the configuration of the region V53 is similar to the configuration of the region V13 in the screen V10 of the control device 10 according to the first embodiment except that information on the imaging device 20 side is not presented. For example, in the example shown in FIG. 28, pieces of display information V531 to V534 are displayed in the region V53. Here, the display information V531, V532, V533, and V534 in FIG. 28 correspond to V131, V132, V134, and V136 in the screen V10 shown in FIG. 15.

On the other hand, on the screen V50 according to the present embodiment, information V561 indicating the settings and states related to image capturing of each of the plurality of imaging devices 20 connected to the control device 10 is displayed in the region V55 in association with regions different from one another in the region V55 for each of the imaging device 20. For example, in the example shown in FIG. 28, in each of regions denoted by the reference characters V56a to V56e in the region V55, pieces of the information V561 indicating an operation mode and an imaging state (for example, a recording state) are displayed for the imaging devices 20 different from one another. For example, in the region V56a, the information V561 indicating the operation mode and imaging state of the imaging device 20a is displayed. Similarly, in the regions V56b to V56e, pieces of the information V561 indicating the operation modes and imaging states of the imaging devices 20b to 20e are displayed.

Note that the order of displaying the respective pieces of information V561 of the plurality of imaging devices 20 in the region V53 may be controlled in accordance with a predetermined condition. As a specific example, the respective pieces of information V561 of the plurality of imaging devices 20 may be displayed in accordance with the order of connection to the control device 10 via the network N1. In addition, as another example, the respective pieces of information V561 of the plurality of imaging devices 20 may be displayed in the order corresponding to identification information (for example, number or the like) set in advance for each of the plurality of imaging devices 20. In addition, as another example, the respective pieces of information V561 of the plurality of imaging devices 20 may be displayed in the order corresponding to the positional relationship of the respective plurality of imaging devices 20. More specifically, control may be exerted such that the information V561 of the imaging device 20 positioned closer to the control device 10 is displayed by higher priority (for example, to be positioned closer to the left side). In addition, as another example, the respective pieces of information V561 of the plurality of imaging devices 20 may be displayed in the order corresponding to the respective states of the plurality of imaging devices 20. As a more specific example, control may be exerted such that the information V561 of the imaging device 20 having a higher remaining battery level among the plurality of imaging devices 20 is displayed by higher priority (for example, to be positioned closer to the left side). As a matter of course, the example described above is a mere example, and the method is not particularly limited as long as weights can be assigned to the plurality of imaging devices 20 in accordance with a predetermined condition, and the order of displaying the information V561 of each of the plurality of imaging devices 20 can be controlled in accordance with the weights.

In addition, information indicating the setting of the order of displaying the respective pieces of information V561 of the plurality of imaging devices 20 in the region V53 may be held in a predetermined storage area. With such a configuration, when the plurality of imaging devices 20 are connected to the control device 10, for example, it is also possible to cause the respective pieces of information V561 of the plurality of imaging devices 20 to be displayed in the region V53 in a similar order to a previous connection.

In the region V11, a so-called preview image, an actually captured image, and the like are displayed. In addition, in the region V11, information indicating various settings and states is superimposed on a displayed image in some cases. For example, in the example shown in FIG. 28, pieces of display information V511 to V514 corresponding to various settings and states of the control device 10 are displayed in the region V11. Here, the display information V511, V513, and V514 in FIG. 28 correspond to V113, V114, and V115 on the screen V10 shown in FIG. 15. In addition, the display information V512 indicates that the control device 10 is operating in the multi mode. Note that pieces of the display information V511 to V514 are temporarily displayed in accordance with a predetermined trigger, and are not displayed in the case where the control device 10 is in the standard state.

In addition, in the region V51, display information V562 corresponding to the state of each of the plurality of imaging devices 20 is displayed for each of the imaging devices 20 in some cases. At this time, for example, the display information V562 corresponding to the state of the imaging device 20a is displayed close to the information V561 of the imaging device 20a displayed in the region V56a in the region V55. For example, in the example shown in FIG. 28, the display information V562 corresponding to the state of the imaging device 20a is displayed at a position equivalent to directly above the display information V561 of the imaging device 20a displayed in the region V56a in a region close to the lower end of the region V51. In addition, for each of the imaging devices 20b to 20e, the display information V562 of each of the imaging devices 20 is similarly displayed close to the display information V561 of the imaging device 20 displayed in the region V55.

In addition, the display information V562 of each of the respective imaging devices 20 is displayed temporarily in accordance with a predetermined trigger, and is not displayed in the case where the imaging device 20 is in the standard state. As a specific example, in the case where a state anomaly such as a temperature anomaly or the like or a state in which some functions or manipulations are restricted, such as during execution of processing, is detected in each of the imaging devices 20, display information corresponding to the state is displayed as the display information V562 of the imaging device 20.

Note that the manner of displaying an image such as a preview image in the region V51 is not particularly limited. For example, only images captured by some of the imaging devices 20 which are selected by the user from the plurality of imaging devices 20 connected to the control device 10 may be displayed in the region V51. In addition, as another example, by dividing the region V51 into a plurality of regions, an image captured by each of the plurality of imaging devices 20 may be caused to be displayed in each of the divided regions.

In addition, in the state where each of the imaging devices 20 is capturing an image in the multi mode, at least some of manipulations via the input interface of each of the control device 10 and the imaging device 20 may be restricted in order to prevent an incorrect manipulation. As a specific example, in the state where each of the imaging devices 20 is capturing an image in the multi mode, the manipulation of the zoom magnification of each of the imaging devices 20 may be restricted. In this case, control may be exerted such that, in the state where each of the imaging devices 20 is not capturing an image, for example, the manipulation of the zoom magnification of each of the imaging devices 20 is enabled. As a matter of course, regardless of the state of each of the imaging devices 20, a manipulation via the input interface of each of the control device 10 and the imaging device 20 may be enabled at all the times. In addition, at least some of the plurality of imaging devices 20 may be configured such that a manipulation on each of the imaging devices 20 can be set as presetting.

As technical characteristics of the information processing system 2 according to the present embodiment, an example of the UI presented by the control device 10 during the operation in the multi mode has been particularly described above with reference to FIG. 28.

2.3. Evaluation

As described above, the screen V50 presented as the UI of the control device 10 according to the present embodiment includes the region V51 for presenting an image and the regions V53 and V55 for presenting information corresponding to various states, settings, and the like, as shown in FIG. 28. In the regions V53 and V55, information set in advance as a presentation target in accordance with the operation state (operation mode) of the control device 10 is displayed constantly in a predetermined layout as long as the operation state is continued. Note that, on the other hand, various types of information superimposed on an image displayed in the region V11 is temporarily displayed in accordance with a predetermined trigger such as the case where a state in which image capturing is difficult is detected or the like, for example, and is not displayed in the case where the imaging device 20 and the control device 10 itself are in the standard state.

In particular, on the screen V50, the display information V561 corresponding to the state of each of the plurality of imaging devices 20 connected to the control device 10 is displayed constantly in the region V55. With such a configuration, it is possible for the user to always grasp the state of each of the imaging devices 20. In addition, information is not superimposed on an image displayed in the region V51 in the standard state, and thus, the occurrence of such a situation in which a part of the image is shielded by the information is suppressed. That is, it is possible for the user to capture an image in a more suitable environment.

In addition, in the case where at least any of the plurality of imaging devices 20 transitions to a state different from the standard state, such as a temperature anomaly, information (for example, a warning or the like) indicating the state, which is hidden in the standard state, is superimposed on the image displayed in the region V51. With such a configuration, it is possible to raise user awareness that a transition is being made to a state different from the standard state (for example, an abnormal state is being sensed). In addition, at this time, the display information V562 of each of the plurality of imaging devices 20 is displayed to be positioned close to the display information V561 of the imaging device 20 displayed in the region V55. With such a configuration, it is possible for the user to more intuitively grasp the imaging device 20 transitioned to a state different from the standard state among the plurality of imaging devices 20 connected to the control device 10.

3. Hardware Configuration Example

Figure 29:
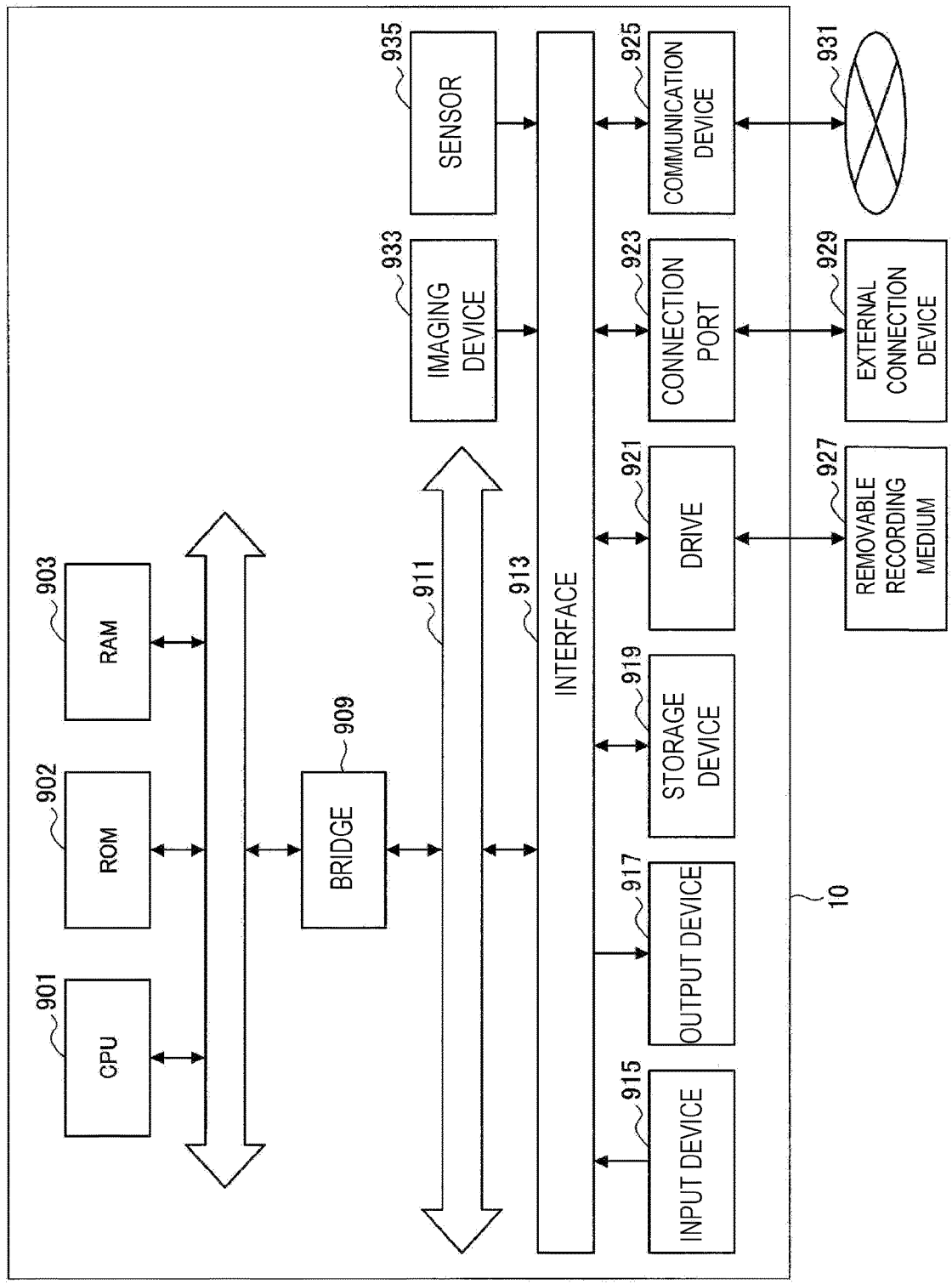
FIG. 29 is a block diagram showing a hardware configuration example of a control device according to one embodiment of the present disclosure.

Next, a hardware configuration of the control device 10 according to an embodiment of the present disclosure will be described with reference to FIG. 29. FIG. 29 is a block diagram illustrating a hardware configuration example of the control device 10 according to an embodiment of the present disclosure.

As illustrated in FIG. 29, the control device 10 includes a central processing unit (CPU) 901, a read only memory (ROM) 903, and a random access memory (RAM) 905. In addition, the control device 10 may include a host bus 907, a bridge 909, an external bus 911, an interface 913, an input device 915, an output device 917, a storage device 919, a drive 921, a connection port 923, and a communication device 925. Further, the control device 10 may include an imaging device 933 and a sensor 935 as necessary. The control device 10 may include a processing circuit such as a digital signal processor (DSP) or an application specific integrated circuit (ASIC) instead of or in addition to the CPU 901.

The CPU 901 serves as an operation processing device and a control device, and controls all of or a part of the operations in the control device 10 in accordance with various programs recorded in the ROM 903, the RAM 905, the storage device 919 or a removable recording medium 927. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909. Note that, each of the configuration of the above-described control unit 140 may be implemented by the CPU 904, for example.

The input device 915 is, for example, a device manipulated by a user with a mouse, a keyboard, a touch panel, buttons, switches, a lever, and the like. The input device 915 may include a mic that detects a sound of a user. The input device 915 may be, for example, a remote control unit using infrared light or other radio waves, or may be an external connection device 929 such as a portable phone operable in response to the manipulation of the control device 10. The input device 915 includes an input control circuit that generates an input signal on the basis of the information input by a user and outputs the input signal to the CPU 901. By manipulating the input device 915, a user can input various types of data to the control device 10 or issue instructions for causing the control device 10 to perform a processing operation. In addition, the imaging device 933 to be described below can function as an input device by imaging a motion or the like of a hand of the user. Note that, the above-described input unit 120 may be implemented by the input device 915, for example.

The output device 917 includes a device capable of visually or audibly notifying a user of the acquired information. The output device 917 may be, for example, a display device such as a liquid crystal display (LCD), a plasma display panel (PDP), an organic electro-luminescence (EL) display, and a projector, a hologram display device, an audio output device, such as a speaker or a headphone, and a printer. The output device 917 outputs the results obtained from the process of the control device 10 in a form of video such as text or an image and voice or sound. In addition, the output device 917 may include a light or the like to brighten the surroundings. Note that, the above-described output unit 110 may be implemented by the output device 917, for example.

The storage device 919 is a device for data storage configured as an example of a storage unit of the control device 10. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside. Note that the above-described storage unit 150 may be implemented by the storage device 919, for example.

The drive 921 is a reader/writer for the removable recording medium 927 such as a magnetic disk, an optical disk, a magneto-optical disk, or a semiconductor memory, and is embedded in the control device 10 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect devices to the control device 10. The connection port 923 may be, for example, a universal serial bus (USB) port, an IEEE1394 port, a small computer system interface (SCSI) port, or the like. In addition, the connection port 923 may be an RS-232C port, an optical audio terminal, High-Definition Multimedia Interface (HDMI) (registered trademark) port, or the like. By connecting the external connection device 929 to the connection port 923, various data may be exchanged between the control device 10 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB), or the like. In addition, the communication device 925 may be a router for optical communication, a router for asymmetric digital subscriber line (ADSL), a modem for various kinds of communications, or the like. The communication device 925 transmits and receives signals to and from, for example, the Internet or other communication devices using a predetermined protocol such as TCP/IP. In addition, the communication network 931 to be connected to the communication device 925 is a network connected in a wired or wireless manner, and is, for example, the Internet, a home LAN, infrared communication, radio wave communication, satellite communication, or the like. Note that the above-described communication unit 130 may be implemented by the communication device 925, for example.

The imaging device 933 is a device that generates an image by imaging a real space using an image sensor such as a charge-coupled device (CCD) or a complementary metal oxide semiconductor (CMOS), as well as various members such as one or more lenses for controlling the formation of a subject image on the image sensor, for example. The imaging device 933 may be a device that captures still images and may also be a device that captures moving images. Note that the above-described imaging unit 207 may be implemented by the imaging device 933, for example.

The sensor 935 is any of various sensors such as an acceleration sensor, a gyro sensor, a geomagnetic sensor, an optical sensor, or a sound sensor, for example. The sensor 935 acquires information regarding the state of the control device 10, such as the attitude of the case of the control device 10, as well as information regarding the environment surrounding the control device 10, such as brightness or noise surrounding the control device 10, for example. The sensor 935 may also include a global positioning system (GPS) sensor that receives GPS signals and measures the latitude, longitude, and altitude of the device.

The foregoing thus illustrates an exemplary hardware configuration of the control device 10. Each of the above components may be realized with general-purpose members or hardware specialized in the function of each component. Such a configuration may also be modified as appropriate in accordance with the technological level at the time of the implementation.

Further, it is also possible to create a program for causing hardware such as a processor, a memory, and a storage incorporated into a computer to exert a function equivalent to the structural elements included in the above-described control device 10. In addition, it is also possible to provide a computer readable storage medium in which the program is recorded.

4. Conclusion

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
a display control unit configured to
cause an image captured by any of one or a plurality of imaging devices to be displayed in a captured image display region that is a part of a display unit,
cause second information related to the one or plurality of imaging devices to be displayed in a captured image hiding region that is a part of the display unit and different from the captured image display region, and
cause first information related to the one or plurality of corresponding imaging devices to be displayed in the captured image display region in accordance with the second information being displayed and the one or plurality of imaging devices being in a predetermined state.

(2)

The information processing apparatus according to (1), in which the second information is information related to an operation state of the one or plurality of imaging devices and displayed constantly.

(3)

The information processing apparatus according to (1) or (2), in which the first information is information related to capturing of the image or restriction of a manipulation performed by the one or plurality of imaging devices.

(4)

The information processing apparatus according to any one of (1) to (3), in which an operation state of the imaging devices is a state related to a state or setting related to capturing of the image performed by the one or plurality of imaging devices.

(5)

The information processing apparatus according to any one of (1) to (4), including:

a communication unit configured to communicate with the imaging devices, in which the display control unit causes the image captured by the imaging devices to be displayed in the captured image display region.

(6)

The information processing apparatus according to (5), including:

an imaging control unit configured to, on a basis of communication with the imaging devices via the communication unit, control an operation of the imaging devices.

(7)

The information processing apparatus according to any one of (1) to (4), including:

at least one of the the one or plurality of imaging devices, in which the display control unit causes the image captured by the imaging device to be displayed in the captured image display region.

(8)

The information processing apparatus according to any one of (1) to (7), in which the display control unit causes the second information related to the plurality of imaging devices to be displayed, and causes first information related to the plurality of imaging devices corresponding to the second information to be displayed in accordance with the second information being displayed and a state of the plurality of imaging devices.

(9)

The information processing apparatus according to (8), in which the display control unit causes the first information to be displayed in the captured image display region for each of the plurality of imaging devices in association with the second information associated with the imaging device, in accordance with the state of each of the imaging devices.

(10)

The information processing apparatus according to (8) or (9), in which the display control unit causes the second information associated with each of the plurality of imaging devices to be displayed in the captured image hiding region in an order corresponding to a predetermined condition.

(11)

The information processing apparatus according to any one of (1) to (10), in which the display control unit presents a plurality of the captured image hiding regions on the display unit, and causes the plurality of respective captured image hiding regions to display pieces of information different from one another as the second information.

(12)

The information processing apparatus according to (11), in which the display control unit causes information corresponding to a state or setting related to capturing of the image to be displayed in some of the plurality of captured image hiding regions.

(13)

The information processing apparatus according to (11), in which the display control unit causes information corresponding to another state different from the state related to capturing of the image to be displayed in some of the plurality of captured image hiding regions.

(14)

The information processing apparatus according to any one of (1) to (13), including:

a manipulation unit configured to accept a manipulation on the display unit in a predetermined direction; and a housing configured to hold the display unit and the manipulation unit such that the display unit and the manipulation unit are positioned close to each other, in which the display control unit causes display information corresponding to a manipulating direction of the manipulation unit to be displayed as the first information in a portion of the captured image display region positioned close to the manipulation unit, in accordance with a display state of information on the display unit.

(15)

The information processing apparatus according to (14), in which the display control unit causes the display information to be displayed in the captured image display region such that the manipulating direction of the manipulation unit and a direction indicated by the display information displayed in the captured image display region substantially match.

(16)

An information processing method including, by a processor:

causing an image captured by any of one or a plurality of imaging devices to be displayed in a captured image display region that is a part of a display unit;

causing second information related to the one or plurality of imaging devices to be displayed in a captured image hiding region that is a part of the display unit and different from the captured image display region; and causing first information related to the one or plurality of corresponding imaging devices to be displayed in the captured image display region in accordance with the second information being displayed and the one or plurality of imaging devices being in a predetermined state.

(17)

A program causing a computer to execute:

causing an image captured by any of one or a plurality of imaging devices to be displayed in a captured image display region that is a part of a display unit;

causing second information related to the one or plurality of imaging devices to be displayed in a captured image hiding region that is a part of the display unit and different from the captured image display region; and causing first information related to the one or plurality of corresponding imaging devices to be displayed in the captured image display region in accordance with the second information being displayed and the one or plurality of imaging devices being in a predetermined state.

(18)

An information processing system including:

one or a plurality of imaging devices configured to capture an image; and a display control device including a communication unit configured to communicate with the one or plurality of imaging devices and a display control unit configured to cause the image captured by any of the one or plurality of imaging devices to be displayed in a captured image display region that is a part of a display unit, in which the display control unit causes second information related to the one or plurality of imaging devices to be displayed in a captured image hiding region that is a part of the display unit and different from the captured image display region, and causes first information related to the one or plurality of corresponding imaging devices to be displayed in the captured image display region in accordance with the second information being displayed and the one or plurality of imaging devices being in a predetermined state.

(19)

The information processing system according to (18), including:

the plurality of imaging devices, in which in accordance with a state or setting of each of the plurality of imaging devices, the display control unit causes the second information to be displayed in the captured image hiding region for each of the imaging devices in association with the imaging devices.

REFERENCE SIGNS LIST 1, 2 information processing system
10 control device
11 housing
110 output unit
111 display unit
120 input unit
121 recording button
122 up-down button
123 power button
124 menu button
130 communication unit
140 control unit
141 input analysis unit
143 output control unit
150 storage unit
191 projecting portion
192 connector
193 fitting portion
20 imaging device
21 housing
22 lens unit
207 imaging unit
210 output unit
211 display unit
220 input unit
221 recording button
222 upper button
223 lower button
224 power button
225 menu button
230 communication unit
240 control unit
241 imaging control unit
243 input analysis unit
245 output control unit
250 storage unit
260 imaging unit
261 lens optical system
270 sound collection unit
291 fitting portion
292 memory card slot
293 battery cover
294 lock switch

The invention claimed is:

1. An information processing apparatus, comprising:
a display device; and
a central processing unit (CPU) configured to:
control display of a captured image in a first region, wherein the first region is a part of a display region of the display device;
control display of first information related to imaging associated with the captured image, in a second region, wherein
the second region is a part of the display region of the display device, and
the second region is different from the first region; and
control superimposed display of a warning of a temperature anomaly on the captured image, in the first region based on detection of the temperature anomaly, wherein the warning of the detected temperature anomaly is concurrently displayed with the first information.

2. The information processing apparatus according to claim 1, wherein
the detection of the temperature anomaly is based on a value of a temperature associated with the information processing apparatus, and
the temperature is outside of a temperature range.

3. The information processing apparatus according to claim 1, wherein
the first information is associated with an operation state of the image processing apparatus, and
the first information is displayed constantly.

4. The information processing apparatus according to claim 3, wherein the operation state of the information processing apparatus is one of a state or a setting related to the captured image.

5. The information processing apparatus according to claim 1, wherein second information includes the warning of the detected temperature anomaly.

6. The information processing apparatus according to claim 5, wherein
the CPU is further configured to control display of the second information based on a transition of an operation state of the information processing apparatus from a standard state to a non-standard state of the information processing apparatus, and
an operation of the information processing apparatus has an anomaly in the non-standard state.

7. The information processing apparatus according to claim 6, wherein the CPU is further configured to control the display of the first information and the second information in the first region.

8. The information processing apparatus according to claim 1, further comprising:
- an input button configured to accept a manipulation on the display device in a determined direction; and
- a housing configured to hold the display device and the input button such that the display device is positioned close to the input button, wherein
  - the CPU is further configured to control display of display information corresponding to a manipulating direction of the input button, and
  - the display information is displayed in a portion of the first region positioned close to the input button, based on a display state of the display device.

9. A non-transitory computer-readable medium having stored thereon, computer-executable instructions which, when executed by a processor, cause the processor to execute operations, the operations comprising:
- controlling display of a captured image in a first region, wherein the first region is a part of a display region of a display device;
- controlling display of first information related to imaging associated with the captured image, in a second region, wherein
  - the second region is a part of the display region of the display device, and
  - the second region is different from the first region; and
- controlling superimposed display of a warning of a temperature anomaly on the captured image, in the first region based on detection of the temperature anomaly, wherein the warning of the detected temperature anomaly is concurrently displayed with the first information.

10. The non-transitory computer-readable medium according to claim 9, wherein
- the detection of the temperature anomaly is based on a value of a temperature of a device associated with the imaging of the captured image, and
- the temperature is outside of a temperature range.

11. The non-transitory computer-readable medium according to claim 9, wherein
- the first information is associated with an operation state of a device associated with the imaging of the captured image, and
- the first information is displayed constantly.

12. The non-transitory computer-readable medium according to claim 11, wherein the operation state of the device is one of a state or setting related to a capture of the image.

13. The non-transitory computer-readable medium according to claim 9, wherein second information includes the warning of the detected temperature anomaly.

14. The non-transitory computer-readable medium according to claim 13, the operations further comprising
- controlling display of the second information based on a transition of an operation state of a device associated with the imaging of the captured image from a standard state to a non-standard state of the device, wherein an operation of the device has an anomaly in the non-standard state.

15. The non-transitory computer-readable medium according to claim 14, the operations further comprising
- controlling the display of the first information and the second information in the first region.

* * * * *